United States Patent
Huang et al.

(10) Patent No.: US 12,231,972 B2
(45) Date of Patent: Feb. 18, 2025

(54) BEAM-BASED RELAY NODE SWITCH

(71) Applicant: QUALCOMM Incorporated, San Diego, CA (US)

(72) Inventors: Min Huang, Beijing (CN); Jing Dai, Beijing (CN); Qiaoyu Li, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/757,334

(22) PCT Filed: Dec. 20, 2019

(86) PCT No.: PCT/CN2019/126925
§ 371 (c)(1),
(2) Date: Jun. 14, 2022

(87) PCT Pub. No.: WO2021/120163
PCT Pub. Date: Jun. 24, 2021

(65) Prior Publication Data
US 2023/0100201 A1  Mar. 30, 2023

(51) Int. Cl.
*H04W 36/00* (2009.01)
*H04W 36/08* (2009.01)
*H04W 88/04* (2009.01)

(52) U.S. Cl.
CPC ..... *H04W 36/0077* (2013.01); *H04W 36/085* (2023.05); *H04W 88/04* (2013.01)

(58) Field of Classification Search
CPC  H04W 36/0077; H04W 36/085; H04W 88/04
USPC ...................................................... 370/311
See application file for complete search history.

(56) References Cited

U.S. PATENT DOCUMENTS

| 10,178,594 | B1 | 1/2019 | Liu et al. |
| 10,230,448 | B2 | 3/2019 | Calcev et al. |
| 10,849,134 | B2 | 11/2020 | Islam et al. |
| 2011/0286381 | A1 | 11/2011 | Ye et al. |

(Continued)

FOREIGN PATENT DOCUMENTS

| CN | 102118810 A | 7/2011 |
| CN | 102164385 A | 8/2011 |

(Continued)

OTHER PUBLICATIONS

Supplementary European Search Report—EP19956702—Search Authority—The Hague—Jul. 6, 2023.

(Continued)

*Primary Examiner* — Farid Seyedvosoghi
(74) *Attorney, Agent, or Firm* — Patterson & Sheridan LLP

(57) ABSTRACT

Techniques for beam-based relay node switch. An example method of wireless communication by a first wireless node generally includes relaying wireless communications between a user equipment (UE) (120, 120a-y) and a network entity; transmitting, to one or more second wireless nodes, relay request signals via a plurality of beams (402a-d, 602a-d, 604a-b, 706a-b) at relay request signal occasions (1, 2, 3), wherein each of the relay request signals indicates a request to switch relay services of the UE (120, 120a-y) from the first wireless node to the one or more second wireless nodes; and switching the relay services of the UE (120, 120a-y) to at least one of the one or more second wireless nodes.

32 Claims, 14 Drawing Sheets

(56) References Cited

U.S. PATENT DOCUMENTS

| | | |
|---|---|---|
| 2012/0026865 A1 | 2/2012 | Fan et al. |
| 2012/0044836 A1 | 2/2012 | Sivavakeesar et al. |
| 2012/0225650 A1* | 9/2012 | Son .................. H04W 36/08 |
| | | 455/434 |
| 2018/0103407 A1 | 4/2018 | Nagaraja et al. |
| 2018/0160338 A1* | 6/2018 | Huang .................. H04W 88/04 |
| 2018/0249461 A1 | 8/2018 | Miao et al. |
| 2018/0295534 A1* | 10/2018 | Huang .................. H04W 76/15 |
| 2018/0343598 A1 | 11/2018 | Xu et al. |
| 2019/0260456 A1 | 8/2019 | Zhou et al. |
| 2019/0289520 A1 | 9/2019 | Xu et al. |

FOREIGN PATENT DOCUMENTS

| | | |
|---|---|---|
| CN | 102960051 A | 3/2013 |
| CN | 109075852 A | 12/2018 |
| CN | 110574427 A | 12/2019 |
| EP | 3185612 A1 | 6/2017 |
| EP | 3297324 A1 | 3/2018 |
| WO | 2018084987 A1 | 5/2018 |

OTHER PUBLICATIONS

International Search Report and Written Opinion—PCT/CN2019/126925—ISA/EPO—Sep. 24, 2020.

* cited by examiner

BEAM-BASED RELAY NODE SWITCH

CROSS-REFERENCE OF RELATED APPLICATION(S)

This application is a national stage application under 35 U.S.C. 371 which claims benefit of and priority to International Application No. PCT/CN2019/126925, filed Dec. 20, 2019, which is hereby assigned to the assignee hereof, and hereby expressly incorporated by reference herein in its entirety as if fully set forth below and for all applicable purposes.

INTRODUCTION

Aspects of the present disclosure relate to wireless communications, and more particularly, to techniques for switching a relay node.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include an improved relay node switch.

Certain aspects provide a method of wireless communication by a first wireless node. The method generally includes relaying wireless communications between a user equipment (UE) and a network entity; transmitting, to one or more second wireless nodes, relay request signals via a plurality of beams at relay request signal occasions, wherein each of the relay request signals indicates a request to switch relay services of the UE from the first wireless node to the one or more second wireless nodes; and switching the relay services of the UE to at least one of the one or more second wireless nodes.

Certain aspects provide a method of wireless communication by a second wireless node. The method generally includes receiving, from a first wireless node, one or more relay request signals via one or more beams at one or more relay request signal occasions, wherein each of the relay request signals indicates a request to switch wireless communication relay services of a user equipment (UE) from the first wireless node to the second wireless node; switching wireless communication relay services of the UE to the second wireless node; and after switching the wireless communication relay services, relaying communications between the UE and a network entity.

Certain aspects provide a method of wireless communication by a user equipment (UE). The method generally includes communicating with a network entity via first wireless communications with a first wireless node; receiving, from one or more second wireless nodes, one or more discovery signals at one or more discovery signal occasions; switching from the first wireless node to at least one of the second wireless nodes to communicate with the network entity based on the received discovery signals; and communicating with the network entity via second wireless communications with at least one of the second wireless nodes.

Certain aspects provide a method of wireless communication by a network entity. The method generally includes communicating with a user equipment (UE) via first wireless communications with a first wireless node; configuring the first wireless node with one or more associations between relay request signal occasions and at least one of acknowledgement signal occasions, control signal occasions, discovery signal occasions, or a plurality of beams used to switch relay services of the UE from the first wireless node to one or more second wireless nodes; and communicating with the UE via second wireless communications with the one or more second wireless nodes.

Certain aspects provide an apparatus for wireless communication. The apparatus generally includes a transceiver configured to relay wireless communications between a user equipment (UE) and a network entity and transmit, to one or more second wireless nodes, relay request signals via a plurality of beams at relay request signal occasions, wherein each of the relay request signals indicates a request to switch relay services of the UE from the apparatus to the one or more second wireless nodes. The apparatus further includes a processing system configured to switch the relay services of the UE to at least one of the one or more second wireless nodes.

Certain aspects provide an apparatus for wireless communication. The apparatus generally includes a transceiver configured to receive, from a first wireless node, one or more relay request signals via one or more beams at one or more relay request signal occasions, wherein each of the relay request signals indicates a request to switch wireless communication relay services of the UE from the first wireless node to the apparatus. The apparatus further includes a processing system configured to switch wireless communication relay services of a UE to the apparatus. The transceiver is further configured to relay communications between the UE and a network entity after switching the wireless communication relay services.

Certain aspects provide an apparatus for wireless communication. The apparatus generally includes a transceiver configured to communicate with a network entity via first wireless communications with a first wireless node and receive, from one or more second wireless nodes, one or more discovery signals at one or more discovery signal occasions. The apparatus further includes a processing system configured to switch from the first wireless node to at least one of the second wireless nodes to communicate with the network entity based on the received discovery signals. The transceiver is further configured to communicate with the network entity via second wireless communications with at least one of the second wireless nodes.

Certain aspects provide an apparatus for wireless communication. The apparatus generally includes a transceiver configured to communicate with a user equipment (UE) via first wireless communications with a first wireless node. The apparatus further includes a processing system configured to configure the first wireless node with one or more associations between relay request signal occasions and at least one of acknowledgement signal occasions, control signal occasions, discovery signal occasions, or a plurality of beams used to switch relay services of the UE from the first wireless node to one or more second wireless nodes. The transceiver is further configured to communicate with the UE via second wireless communications with the one or more second wireless nodes.

Certain aspects provide an apparatus for wireless communication. The apparatus generally includes means for relaying wireless communications between a user equipment (UE) and a network entity; means for transmitting, to one or more second wireless nodes, relay request signals via a plurality of beams at relay request signal occasions, wherein each of the relay request signals indicates a request to switch relay services of the UE from the first wireless node to the one or more second wireless nodes; and means for switching the relay services of the UE to at least one of the one or more second wireless nodes.

Certain aspects provide an apparatus for wireless communication. The apparatus generally includes means for receiving, from a first wireless node, one or more relay request signals via one or more beams at one or more relay request signal occasions, wherein each of the relay request signals indicates a request to switch wireless communication relay services of a user equipment (UE) from the first wireless node to the apparatus; means for switching wireless communication relay services of the UE to the second wireless node; and means for relaying communications between the UE and a network entity, after switching the wireless communication relay services.

Certain aspects provide an apparatus for wireless communication. The apparatus generally includes means for communicating with a network entity via first wireless communications with a first wireless node; means for receiving, from one or more second wireless nodes, one or more discovery signals at one or more discovery signal occasions; means for switching from the first wireless node to at least one of the second wireless nodes to communicate with the network entity based on the received discovery signals; and means for communicating with the network entity via second wireless communications with at least one of the second wireless nodes.

Certain aspects provide an apparatus for wireless communication. The apparatus generally includes means for communicating with a user equipment (UE) via first wireless communications with a first wireless node; means for configuring the first wireless node with one or more associations between relay request signal occasions and at least one of acknowledgement signal occasions, control signal occasions, discovery signal occasions, or a plurality of beams used to switch relay services of the UE from the first wireless node to one or more second wireless nodes; and means for communicating with the UE via second wireless communications with the one or more second wireless nodes.

Certain aspects provide a computer-readable medium having instructions stored thereon for relaying wireless communications between a user equipment (UE) and a network entity; transmitting, to one or more second wireless nodes, relay request signals via a plurality of beams at relay request signal occasions, wherein each of the relay request signals indicates a request to switch relay services of the UE from the first wireless node to the one or more second wireless nodes; and switching the relay services of the UE to at least one of the one or more second wireless nodes.

Certain aspects provide a computer-readable medium having instructions stored thereon for receiving, from a first wireless node, one or more relay request signals via one or more beams at one or more relay request signal occasions, wherein each of the relay request signals indicates a request to switch wireless communication relay services of a user equipment (UE) from the first wireless node to the second wireless node; switching wireless communication relay services of the UE to the second wireless node; and relaying communications between the UE and a network entity, after switching the wireless communication relay services.

Certain aspects provide a computer-readable medium having instructions stored thereon for communicating with a network entity via first wireless communications with a first wireless node; receiving, from one or more second wireless nodes, one or more discovery signals at one or more discovery signal occasions; switching from the first wireless node to at least one of the second wireless nodes to communicate with the network entity based on the received discovery signals; and communicating with the network entity via second wireless communications with at least one of the second wireless nodes.

Certain aspects provide a computer-readable medium having instructions stored thereon for communicating with a user equipment (UE) via first wireless communications with a first wireless node; configuring the first wireless node with one or more associations between relay request signal occasions and at least one of acknowledgement signal occasions, control signal occasions, discovery signal occasions, or a plurality of beams used to switch relay services of the UE from the first wireless node to one or more second wireless nodes; and communicating with the UE via second wireless communications with the one or more second wireless nodes.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
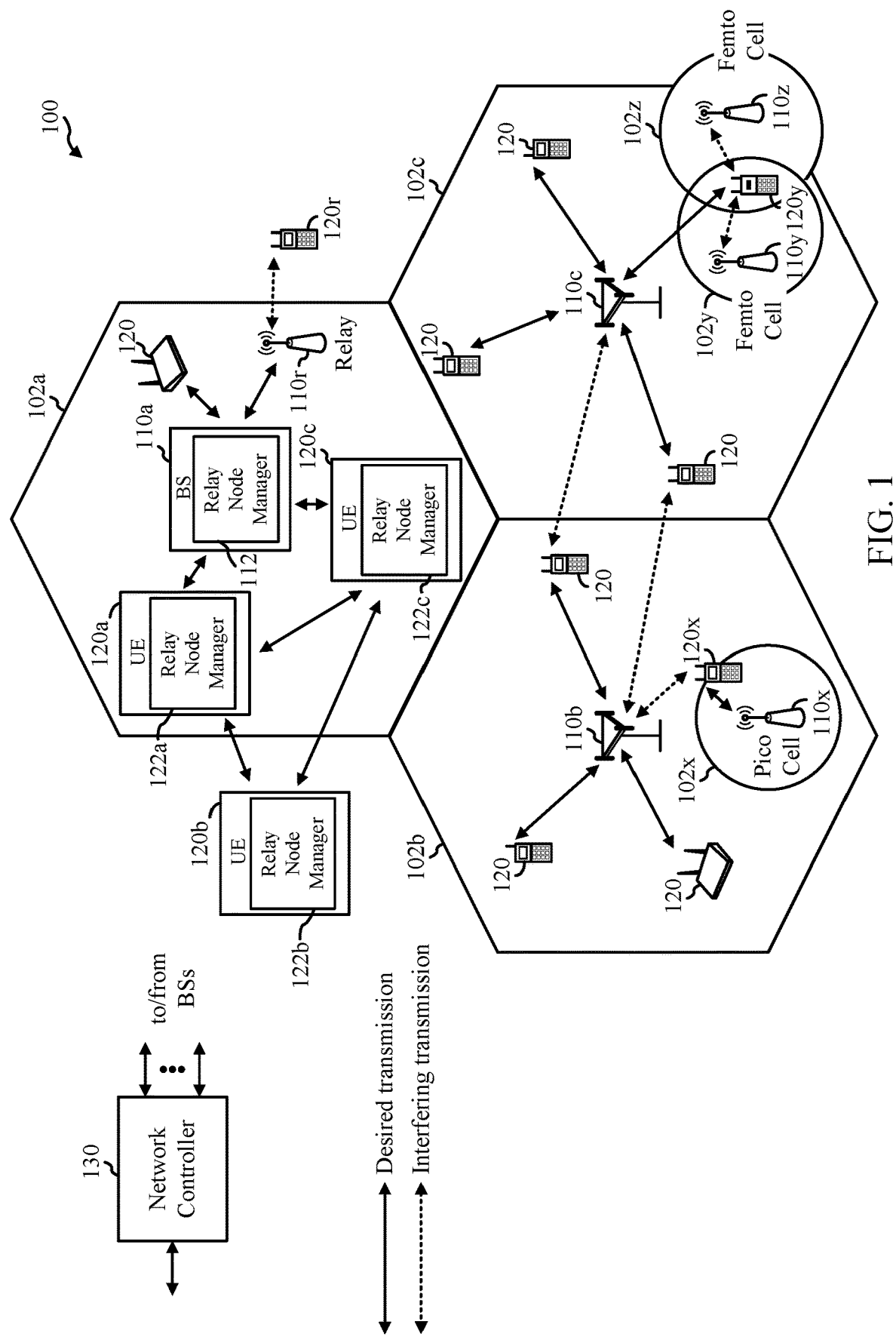
FIG. 1 is a block diagram conceptually illustrating an example telecommunications system, in accordance with certain aspects of the present disclosure.

Aspects of the present disclosure provide apparatus, methods, processing systems, and computer readable mediums for performing a beam-based relay node switch. In certain cases, a relay node may handover wireless communication relay services of a UE to another neighbor relay node. The handover of relay services may also be referred to herein as a relay switch. In certain cases, if the relay switch operation is performed solely by the UE without any assistance from the source relay node, like detecting and awaking target relay nodes, the power consumption from the relay switch activities may significantly impact the battery life of the UE. In certain cases, if there is a large number of neighbors, discovering and activating each neighbor separately may increase the latency of the relay switch and consume high power at a source relay node and/or UE. Such a relay switch process may impact relay switch performance and power consumption of the source relay node and/or UE.

Certain aspects of the present disclosure provide the relay node assisting the UE in performing the relay switch to reduce the power consumption of the UE and mitigate the interruption time of the relay switch process, which may provide enhanced performance (e.g., improved latency and bandwidth) of the wireless communications of the UE. In one or more aspects, the relay node may discover and activate one or more neighbors on a beam basis where the source relay node multicasts/broadcasts various signals across one or more beams to discover and activate neighbors. In other words, instead of performing the discovery and activation on a per neighbor basis, the source relay node may perform the discovery and activation across a certain number of beams, where in certain cases, multiple neighbors may reside in the coverage of one or more beams. Therefore, the relay switch techniques described herein may reduce relay switch latency and reduce power consumption of the source relay and the UE.

The following description provides examples of switching a relay node in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. The wireless communication network 100 may be an NR system (e.g., a 5G NR network).

As shown in FIG. 1, the BS 110a includes a relay node manager 112 that configures a first wireless node (e.g., the UE 120a) with one or more associations between relay request signal occasions and at least one of acknowledgement signal occasions, control signal occasions, discovery signal occasions, or a plurality of beams used to switch relay services of the UE (e.g., the UE 120b) from the first wireless node to one or more second wireless nodes (e.g., the UE 120c), in accordance with aspects of the present disclosure. The UE 120a includes a relay node manager 122a that performs a relay switch on a per beam basis, in accordance with aspects of the present disclosure. The UE 120b includes a relay node manager 122b that receives discovery signals from a relay node (e.g., the UE 120c) and switches from the UE 120a to the UE 120c to communicate with the BS 110 based on the received discovery signals, in accordance with aspects of the present disclosure. The UE 120c includes a relay node manager 122c that performs a relay switch on a per beam basis, in accordance with aspects of the present disclosure.

In some circumstances, two or more subordinate entities (e.g., the UEs 120a-c) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., the UE 120a) to another subordinate entity (e.g., the UE 120b) without relaying that communication through the scheduling entity (e.g., a UE or BS), even though the scheduling entity may be utilized for scheduling and/or control purposes. In some examples, the sidelink signals may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback including HARQ feedback and/or channel state feedback (CSF) related to a sidelink channel quality.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as wireless relay nodes, relay nodes, relays, or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
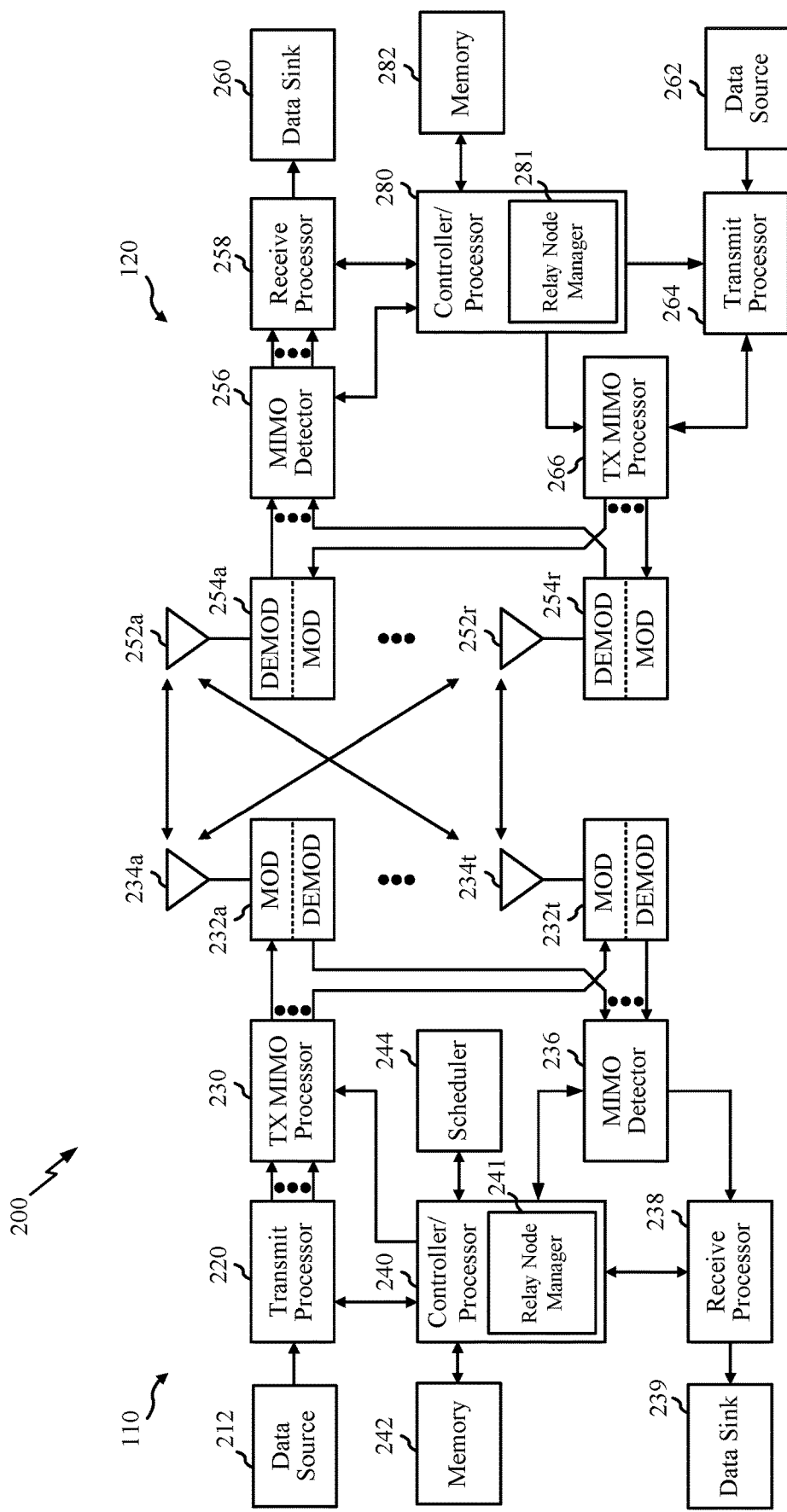
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink and/or uplink.

The controller/processor 280 and/or other processors and modules at the UE 120 may perform or direct the execution of processes for the techniques described herein. For example, as shown in FIG. 2, the controller/processor 240 of the BS 110 has a relay node manager 241 that configures a first wireless node (e.g., the UE 120a) with one or more associations between relay request signal occasions and at least one of acknowledgement signal occasions, control signal occasions, discovery signal occasions, or a plurality of beams used to switch relay services of the UE (e.g., the UE 120b) from the first wireless node to one or more second wireless nodes (e.g., the UE 120c), according to aspects described herein. The controller/processor 280 of the UE 120 has a relay node manager 281 that performs a relay switch on a per beam basis, in accordance with aspects of the present disclosure. In certain aspects, the relay node manager 281 receives discovery signals from a relay node and switches to another relay node for relay services, according to aspects described herein. Although shown at the Controller/Processor, other components of the UE 120 and BS 110 may be used to perform the operations described herein.

While the examples provided in FIG. 2 are described with respect to wireless communications between a UE and a base station, to facilitate understanding, aspects of FIG. 2 may also apply to UEs communicating with each other via sidelink interfaces, for example, as described herein with respect to FIG. 1.

Figure 3:
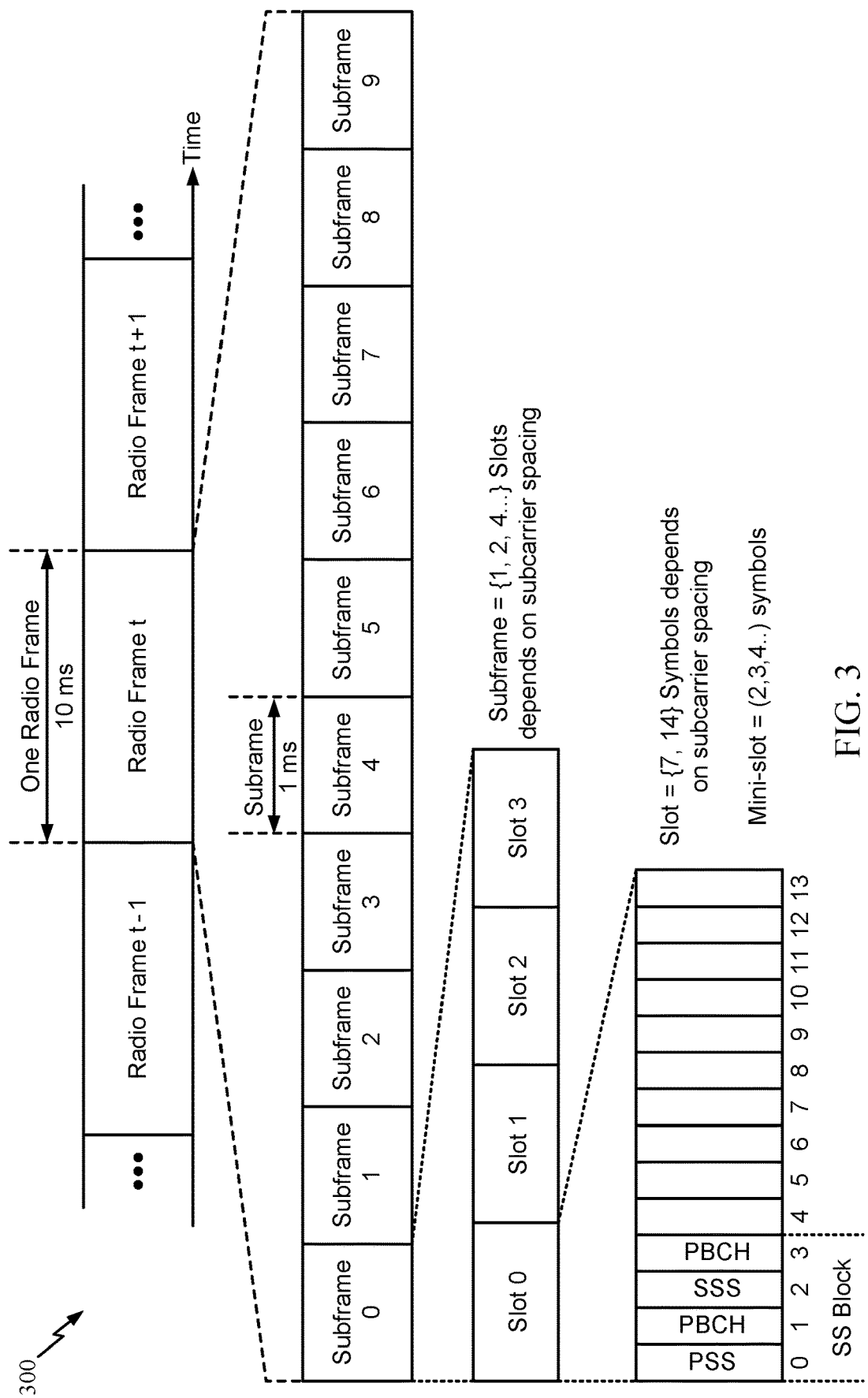
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmWave transmissions. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an access network (AN), or a distributed unit (DU), or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a central unit (CU) to which receiving network access device(s) transmit the measurements of the pilot signals, may use the measurements to identify serving cells for the UEs, or to initiate a change of serving cell for one or more of the UEs.

Example Beam-Based Relay Node Switch

In certain wireless communication networks (e.g., 5G NR), device-to-device (D2D) communications, such as sidelink communications, may include communications between an Internet-of-Things (IoT) device (e.g., smart appliances or wearable devices such as a smart watch, activity tracker, etc.) and a UE (e.g., a mobile phone or access point). In certain cases, the UE may serve as a wireless relay node for the IoT device to communicate with another wireless node and/or a network entity, such as a base station (e.g., the BS 110a of FIG. 1). That is, the UE may relay wireless communications between the IoT device and the network entity, where such relay services may enable the IoT device to reduce its power consumption via low power transmissions to or from the UE.

For example, a relay node (e.g., the UE 120a or UE 120c) may reside in the cell coverage of a base station (e.g., the BS 110a), and a UE (e.g., the UE 120b, which may include an IoT device) may reside either in or out of the cell coverage of the base station. In aspects, the base station communicates with the relay node UE via a Uu (e.g., BS to UE or UE to BS) interface (DL, UL), and the relay node may communicate with the UE via a sidelink interface. In certain cases, it may be quite power inefficient for the UE to communicate directly with the base station, due to various conditions or factors, such as long distance or blocks between the UE and base station, weak reception capability of the UE, low transmission power of the UE, or limited battery capacity of the UE. In aspects, a relay node may include a wireless communication device such as a UE, access point, transmission-reception point, or the like.

When communicating in mmWave spectrum (such as Frequency Range 2 of 5G NR), the relay node may have multiple transmit/receive antennas, enabling beamformed transmissions between the UE and the relay node. In aspects, the beamformed transmissions may extend the coverage and reduce co-channel interference. In certain cases, for example, if the number of transmit/receive antennas is large, the relay node may extend the coverage significantly with a narrow beam, though, at the cost of a large number of beam directions, in certain cases, resulting in a long latency of sweeping all of the beam directions.

In certain cases, the relay node may handover wireless communication relay services of the UE to another relay node. The handover of relay services may also be referred to herein as a relay switch. When a source relay node (i.e., the current relay node relaying communications between the UE and the base station) detects a relay switch is about to occur (e.g. due to various factors, such as mobility of the UE and/or relay node, channel variance, battery status change or load status changes of the relay node), the source relay node may inform the UE to perform a relay switch. If the relay switch operation is performed solely by the UE without any assistance from the source relay node, like detecting and awaking target relay nodes, the power consumption from the relay switch activities may significantly impact the battery life of the UE. Moreover, if the bandwidth of the UE is smaller than the bandwidth of the relay node, the UE may perform inter-frequency measurements, which may cause data transfer interruption, to facilitate the relay switch.

In certain cases of discovering and activating a neighbor relay node, the source relay node may monitor certain frequency spectrums to detect the neighbor relay nodes, then exchange messages with the neighbor relay node to determine the neighbor's availability to relay a UE, and finally indicate to the neighbor to transmit discovery signals to the UE. If the working frequency spectrum is at high-frequency spectrum, like mmWave spectrum, the beam management for the link between source relay node and the neighbor relay node may be involved. If there is a large number of neighbors, discovering and activating each neighbor separately may increase the latency of the relay switch and consume high power at the source relay node. Such a relay switch process may impact relay switch performance and power consumption of the source relay node.

Certain aspects of the present disclosure provide the relay node assisting the UE in performing the relay switch to reduce the power consumption of the UE and mitigate the interruption time of the relay switch process, which may provide enhanced performance (e.g., improved latency and bandwidth) of the wireless communications of the UE. In aspects, the relay node may discover and activate one or more neighbors on a beam basis where the source relay node multicasts/broadcasts various signals across one or more beams to discover and activate neighbors. In other words, instead of performing the discovery and activation on a per neighbor basis, the source relay node may perform the discovery and activation across a certain number of beams where multiple neighbors may reside in the coverage of one or more beams. Therefore, the relay switch techniques described herein may reduce relay switch latency and reduce power consumption of the source relay and/or the UE.

In certain cases, a UE may enter sleep mode so as to save power. For example, when a UE is in sleep mode (e.g., a low power state such as idle state or inactive state), the UE may suspend reception of signals on the PDCCH and PDSCH from the base station. While in sleep mode the UE may periodically monitor a wake-up signal (WUS) at certain time-frequency resource units, for example, called WUS occasions. When the UE successfully detects a WUS, the UE will wake up to receive PDCCH and PDSCH. The WUS may be a certain kind of easy-detectable signal, such as a sequence of symbols modulated with an amplitude and phase-based modulation, that allows the UE to monitor the WUS with an active power consumption of less than the power consumed to detect and decode the PDCCH and PDSCH, for example, less than 1 mW. In certain cases, the WUS may be detectable while a UE is in a lower power state (e.g., a sleep mode) and/or detectable with certain low power hardware.

In certain aspects, while in sleep mode, a relay UE may suspend reception of certain sidelink channels, such as the PSCCH or PSSCH, so as to save power. The sleeping relay UE may periodically monitor the WUS, and when the relay UE successfully detects a WUS, the relay UE may wake up to receive transmissions on the PSCCH and/or PSSCH.

Figure 4:
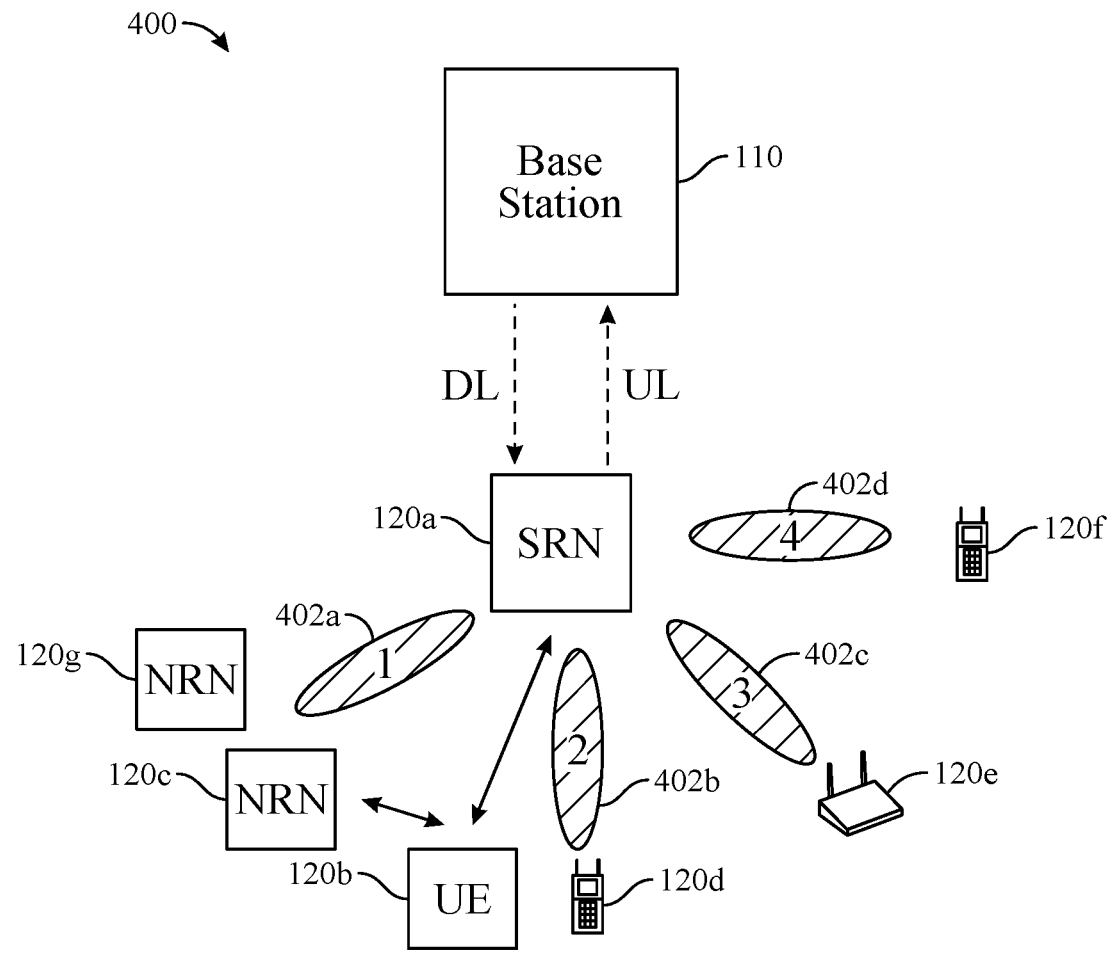
FIG. 4 illustrates an example wireless communication network with relay nodes communicating with a UE and network entity, in accordance with certain aspects of the present disclosure.

FIG. 4 illustrates an example wireless communication network 400 in which aspects of the present disclosure may be performed. As shown, the source relay node (SRN) 120a, also referred to as a wireless relay node, may relay wireless communications between the UE 120b and the base station 110. In certain cases, the SRN 120a may initialize a remote relay switch, for example, due to load status changes at the SRN 120*a*. The SRN 120*a* may probe the surrounding area with relay request signals via beams 402*a-d* to identify neighbor relay nodes (NRNs) for the relay switch. In this example, the SRN 120*a* may wirelessly communicate with the NRNs 120*c-g* via beamformed transmission such as the beams 402*a-d*, which may represent transmit and/or receive beams of the SRN 120*a* and/or NRNs 120*c-g*. For example, the NRNs 120*c-g* may be located within the coverage area of the beams 402*a-d*, and in certain cases, multiple NRNs 120*c*, 120*g* are located within the coverage area of the beam 402*a*. In aspects, the NRNs 120*c-g* may be able to detect beamformed transmissions from all or some of the beams 402*a-d*, but a single beam may provide the best channel properties between the NRNs 120*c-g* and SRN 120*a*. For example, the beam 402*a* may provide the best channel properties between the NRN 120*c* and SRN 120*a*.

Figure 5:
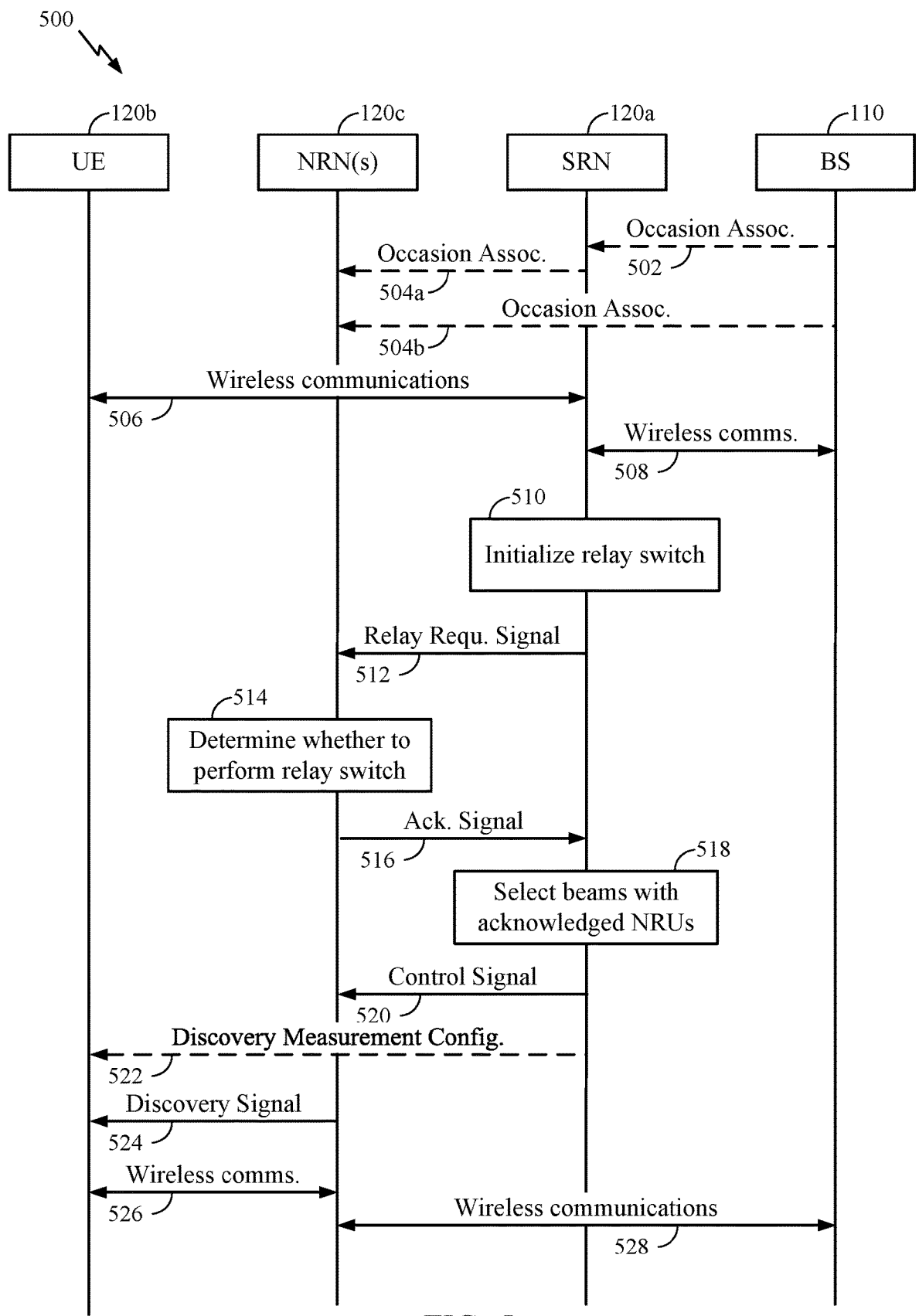
FIG. 5 is a call flow diagram illustrating example signaling for performing a beam-based relay node switch, in accordance with aspects of the present disclosure.

The SRN 120*a* and NRNs 120*c-g* may communicate various signals (such as a relay request signals, acknowledgement signals, and control signals) via the beams 402*a-d* in order to discover and activate at least one of the NRNs 120*c-g* for the relay switch, for example, as further described herein with respect to FIG. 5. Each of the signals transmitted via the beams 402*a-d* may be transmitted at various occasions. As used herein, transmission and/or reception occasions may include certain radio resources such as a time-frequency resources and/or code-division sequences.

As an example, after identifying the NRNs that lie in the beam 402*a* as being a candidate for the relay switch, the SRN 120*a* may transmit a control signal via the beam 402*a*, which may be received by the NRN 120*c* and NRN 120*g*, where the control signal indicates to the NRN to transmit a discovery signal to the UE 120*b*. After performing a relay switch with the UE 120*b*, the NRN 120*c* may relay communication between the UE 120*b* and the base station 110. In aspects, the SRN 120*a*, UE 120*b*, and NRN(s) 120*c-g* may communicate with each other via beamformed sidelink communication channels (e.g., PSDCH, PSCCH, PSSCH, and/or PSFCH).

FIG. 5 is a call flow diagram illustrating example operations for performing a beam-based relay node switch, in accordance with certain aspects of the present disclosure. In certain aspects, the SRN 120*a* and NRN(s) 120*c* may be configured with one or more associations between relay request signal (RRS) occasions and at least one of acknowledgement signal (AS) occasions, control signal (CS) occasions, discovery signal (DS) occasions, or a plurality of beams (e.g., the beams 402*a-d*). The SRN 120*a* and/or BS 110 may configure the NRNs 120*c* with the associations between RRS occasions and the following AS occasions, CS occasions, and/or DS occasions. In certain cases, the associations may be predetermined and known to the SRN 120*a* and NRNs 120*c*.

In certain cases, a network entity, such as BS 110, may control the configuration of the wireless relay nodes, such as the SRN 120*a* and NRNs 120*c*. For example, at 502, the SRN 120*a* may receive, from the BS 110, a configuration indicating the one or more associations. In aspects, the configuration may indicate which of the NRNs 120*c* may be candidates for a relay switch. As the BS 110 may control the configuration of the associations between the various occasions, at 504*b*, the NRNs 120*c* may receive the configuration indicating the one or more associations from the BS 110.

In certain cases, at 504*a*, the SRN 120*a* may transmit, to the NRNs 120*c*, a broadcasting signal (e.g., an SS block and/or a burst of SS blocks) indicating the one or more associations of the various occasions. In aspects, at 504*a*, the SRN 120*a* may forward the configuration received at 502 to the NRNs 120*c*. In certain cases, the associations transmitted at 504*a* may be determined by the SRN 120*a* without the configuration from the BS 110.

In aspects, the SRN 120*a* may broadcast an indication of the associations, for example, via a beamformed sidelink-SS block (S-SSB). In aspects, the SRN may configure the NRNs with the associations via an indication with all the occasions. For example, a common indication, which includes the associations of all the beams, may be transmitted via all the beams of the S-SSBs.

In certain aspects, the associations may be indicated to the NRNs on a per beam basis. For example, an indication, which includes the association of only one beam, may be transmitted in a beamformed S-SSB via a beam that is identical to the RRS and/or CS beam.

In certain aspects, the associations may be indicated via a beam that covers multiple beams used to discover and activate neighbor wireless nodes. For example, an indication, which includes the association of multiple RRS beams, may be transmitted via the S-SSB at the corresponding S-SSB beam that corresponds to several RRS and/or CS beams.

The various occasions may enable the NRNs 120*c* to identify radio resources to acknowledge a relay switch request, receive control signals, and transmit discovery signals. In certain aspects, the various occasions may enable the SRN 120*a* to identify the beams in which acknowledgements are received and radio resources to transmit control signals that indicate to the NRN to transmit a discovery signal to the UE.

The SRN 120*a* may relay wireless communications between the UE 120*b* and the BS 110. For example, at 506, the UE 120*b* may transmit data to the SRN 120*a*, which may forward the data to the BS 110 via the Uu interface at 508.

At 510, the SRN 120*a* may identify that a relay switch is to occur, for example, based on various factors or conditions such as due to channel variance and/or mobility of the UE. At 512, the SRN 120*a* may transmit to the NRNs 120*c* relay request signals via a plurality of beams (e.g., the beams 402*a-d*) at RRS occasions, where each of the relay request signals indicates a request to switch relay services of the UE 120*b* from the SRN 120*a* to NRNs 120*c*.

For example, at 514, the NRNs 120*c* may determine whether to perform the relay switch as requested by the SRN 120*a*. In certain cases, the NRNs 120*c* may consider various conditions or factors, such as the load status or battery life of the NRN 120*c*, in determining whether to perform the relay switch. After determining to perform the relay switch, the NRN 120*c* may identify one of the SRN beams (e.g., beams 402*a-d*) for transmitting an acknowledgement signal based on properties of the relay request signals. The properties may include a channel quality indicator, signal-to-noise ratio (SNR), signal-to-interference plus noise ratio (SINR), signal-to-noise plus distortion ratio (SNDR), and/or a received signal strength indicator (RSSI). In certain cases, the the NRN 120*c* may identify one of the SRN beams with the best channel quality compared to the other beams. The NRN 120*c* may identify the beams based on an association between the beams and the RRS occasions. For example, each relay request signal may be transmitted via a different beam and different RRS occasion, which may enable the NRN 120*c* to identify the beam associated with the RRS occasion.

Figure 6:
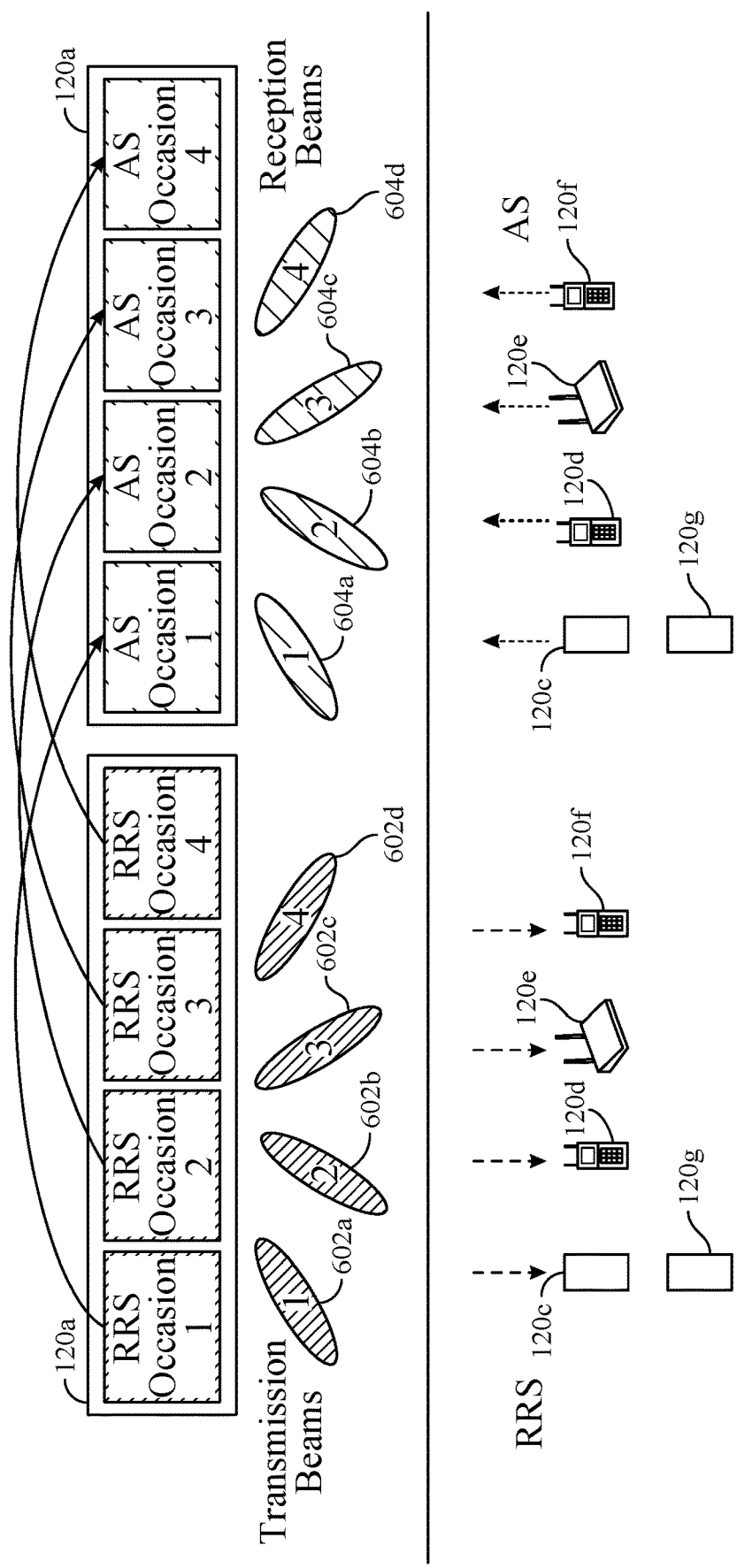
FIG. 6 illustrates a diagram of example associations between relay request signal occasions and acknowledgement occasions, in accordance with certain aspects of the present disclosure.

At 516, the NRNs 120*c* may transmit, to the SRN 120*a*, an acknowledgement signal at an AS occasion, which may be associated with one of the RRS occasions, for example, as further described herein with respect to FIG. 6. The NRN 120c monitors certain RRS occasions and conditionally transmits an AS on the associated AS occasion to acknowledge relay switch. If the NRN 120c detects an RRS and agrees on performing a relay switch, the NRN 120c selects one of the RRS occasions with detected RRS beam and transmits the AS on the associated AS occasion to acknowledge relay switch, where the AS occasion is associated with the RRS occasion of the same beam. The AS occasion for one beam may be unique, so multiple NRNs may transmit ASs without collisions. At the SRN, AS reception may only detect the presence of transmitted AS, regardless of the number of transmitters. For example, the AS may be a certain sequence of symbols, which is common for an AS occasion (e.g., a beam) or for an SRN. Such a configuration for the AS may enable the SRN to receive multiple folds of the AS at one AS occasion without impairing the detection success ratio at the SRN.

After transmitting the AS, the NRN monitors the associated CS occasion for possible CS reception. The CS occasion may be associated with the AS occasion or RRS occasion of the same beam, so multiple NRNs may receive the same signal simultaneously. For example, At 518, the SRN 120a may select the at least one of the beams with acknowledged NRNs, and at 520, the SRN 120a may transmit one or more control signals via the selected beams at one or more CS occasions, which may be associated with the AS occasions, for example, as described herein with respect to FIG. 8.

In certain aspects, at 522, the SRN 120a may configure the UE 120b with a measurement configuration indicating various parameters for the UE 120c to discover the NRNs 120c via one or more discovery signals. For example, the measurement configuration may indicate occasions for the UE 120b to receive discovery signals from the NRNs 120c. In aspects, the SRN 120a may transmit the measurement configuration via various control signals such as sidelink control information.

At 524, the NRNs 120c may transmit, to the UE 120b, one or more discovery signals at a DS occasion. If there are multiple NRNs 120c transmitting discovery signals, the UE 120b may select one of the NRNs 120c based on various properties associated with the discovery signals, such as channel quality, SNR, SINR, SNDR, RSSI, or the like. For example, the UE 120b may select one of the NRNs 120c that provides the best channel quality compared to the other discovery signals.

The NRN 120a may relay wireless communications between the UE 120b and the BS 110. For example, at 526, the UE 120b may transmit data to the NRN 120c, which may forward the data to the BS 110 via the Uu interface at 528.

In aspects, the RRS occasions (which may also be referred to a WUS occasions) may be associated with AS occasions. For example, FIG. 6 illustrates a diagram of an SRN 120a transmitting relay request signals via beams 602a-d at WUS occasions 1-4, where NRNs 120c-f may be located in the coverage area of each of the beams 602a-d respectively. As shown, the SRN 120a may receive acknowledgement signals from the NRNs 120c-f via beams 604a-d at the respective AS occasions 1-4. In this example, WUS occasion 1 is associated with the beams 602a, 604a and the AS occasion 1; WUS occasion 2 is associated with the beams 602b, 604b and the AS occasion 2; and so on.

Figure 7:
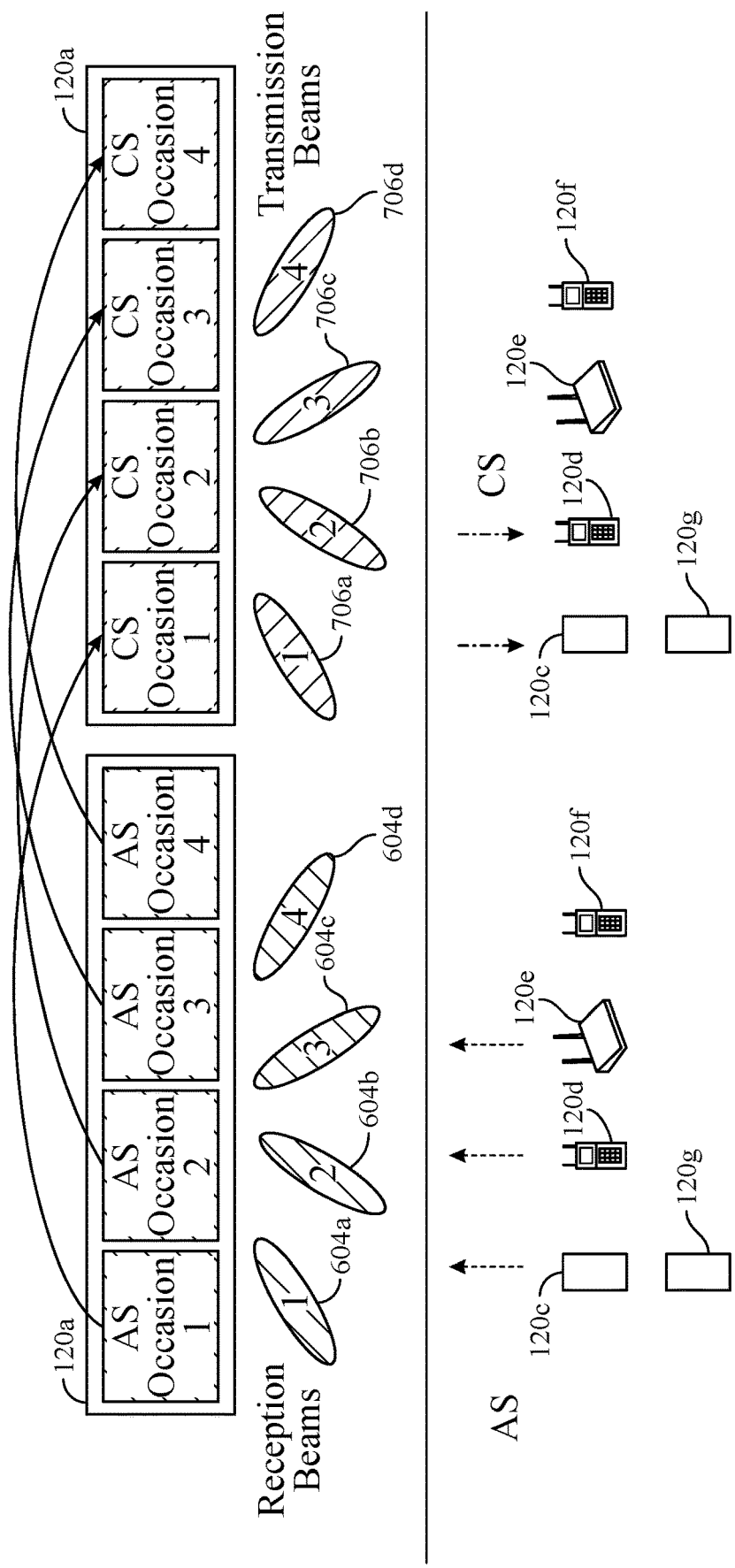
FIG. 7 illustrates a diagram of example associations between acknowledgement occasions and control signal occasions, in accordance with certain aspects of the present disclosure.

In certain aspects, multiple relay nodes may be in the coverage area of a beam, such as the RRS beam 602a. For example, FIG. 7 illustrates a diagram of NRNs 120c and 120g responding to a RRS via the beam 604a, in accordance with certain aspects of the present disclosure. In this example, NRN 120c and NRN 120g both transmit ASs at the AS occasion 1, NRN 120d transmits an AS at AS occasion 2, and NRN 120e transmits an AS at AS occasion 3. As the SRN 120a may only be aware of the number ASs received on the AS occasions, the SRN 120a may only know that at least one NRN transmitted via the beams of the three AS occasions, but SRN 120a may not know the number of NRNs at each beam. In certain cases, the NRN 120f may not transmit an AS based on various conditions or factors, for example, due to the load status of the NRN.

FIG. 7 also illustrates that the AS occasions may be associated with the CS occasions. As shown, after the SRN 120a receives ASs at AS occasion 1, 2 and 3, the SRN 120a transmits CSs at CS occasions 1 and 2, where each of the AS occasions and CS occasions is associated with one of the beams 706a-d. In this example, AS occasion 1 is associated with the beams 604a, 706a and the CS occasion 1; AS occasion 2 is associated with the beams 604b, 706b and the CS occasion 2, and so on.

After the NRN 120c and NRN 120g transmit the AS at AS occasion 1, the NRN 120c and NRN 120g monitor CS occasion 1 and both receive the same CS from the SRN 120a. After the NRN 120d transmits the AS at AS occasion 2, NRN 120d monitors the CS occasion 2 and receives a CS from the SRN 120a. After the NRN 120e transmits the AS at AS occasion 3, the NRN 120e monitors the CS occasion 3 but does not receive any CS from the SRN 120a. As the NRN 120f did not transmit an AS, the NRN 120f does not monitor CS occasion 4.

Figure 8:
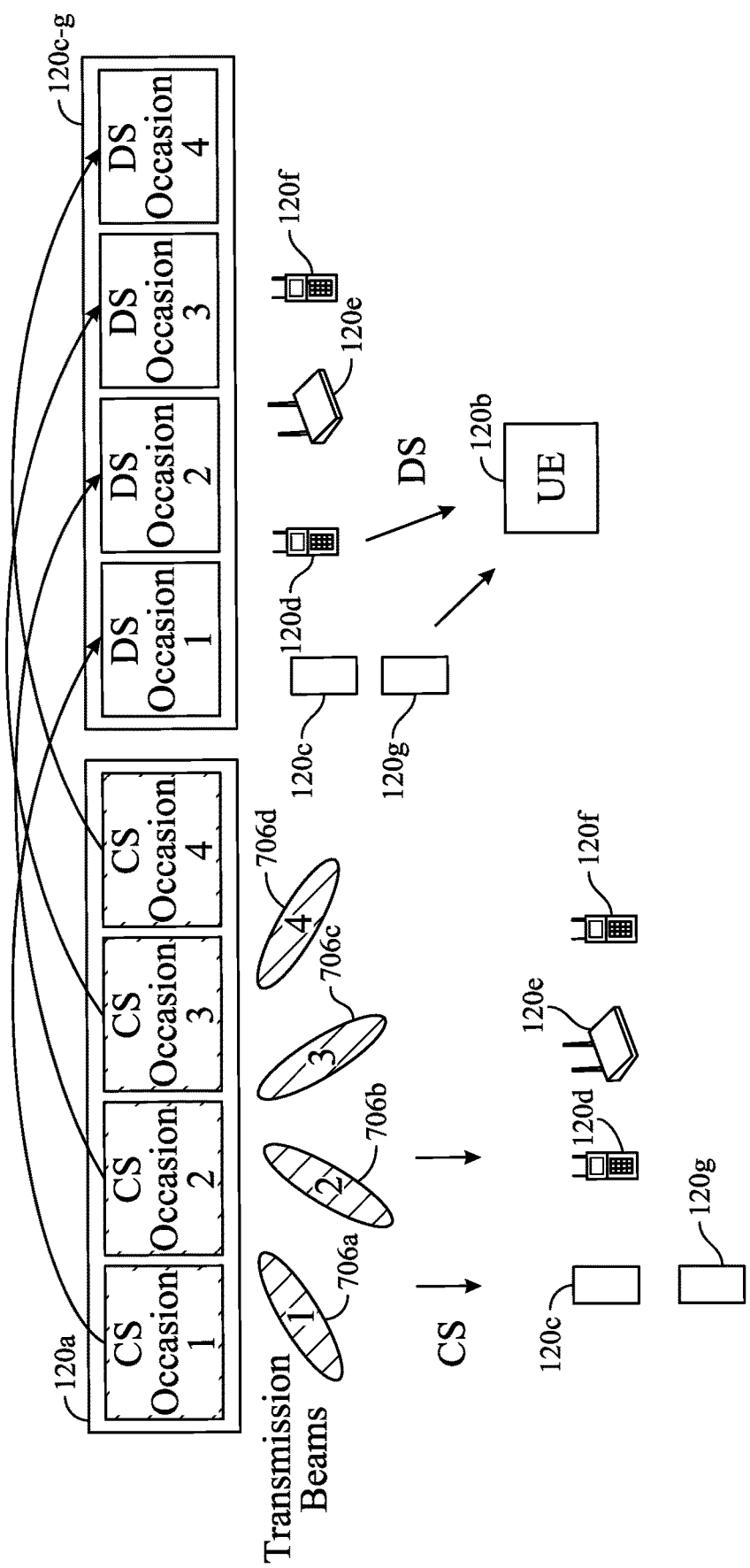
FIG. 8 illustrates a diagram of example associations between control signal occasions and discovery signal occasions, in accordance with certain aspects of the present.

In aspects, the CS occasions may be associated with DS occasions. For example, FIG. 8 illustrates a diagram of the association between CS occasions and DS occasions, in accordance with certain aspects of the present disclosure. In this example, CS occasion 1 is associated with the beam 706a and the DS occasion 1; AS occasion 2 is associated with the beam 706b and the CS occasion 2, and so on.

In aspects, after receiving the CSs, the NRNs may transmit DSs at the respective DS occasions. Referring to FIG. 8, NRN 120c and NRN 120g use DS occasion 1 (associated with CS occasion 1) to transmit a DS to the UE 120b, and NRN 120d uses DS occasion 2 (associated with CS occasion 2) to transmit another DS to the UE 120b. Under such a scheme, mutual interference for DS transmissions by NRNs with different SRN beams (called inter-beam) may be mitigated. The mutual interference for DS transmissions by NRNs with the same SRN beam (called intra-beam) may be resolved using a Zadoff-Chu sequence. For example, in some cases, the DS waveforms may be Zadoff-Chu sequences (like PSS) with different root values, and the DS waveforms of different NRNs may be distinguished by a UE. The intra-beam interference may also be resolved using different time-frequency resources at the DS occasion. For example, the DS occasion for one SRN beam may be associated with multiple time-frequency resources. Each acknowledged NRN in this beam may select one of the resources for transmission of the DS to reduce the DS collision ratio.

While the examples depicted in FIGS. 6-8 show the NRN 120g below the NRN 120c to facilitate understanding, aspects of the present disclosure apply to cases where the NRN 120g lies in the same coverage area as the NRN 120c with respect to the various beams (e.g., beams 602a, 604a, and 706a) used to communicate between the SRN 120a and NRNs 120c, 120g, for example, as depicted FIG. 4.

Figure 9:
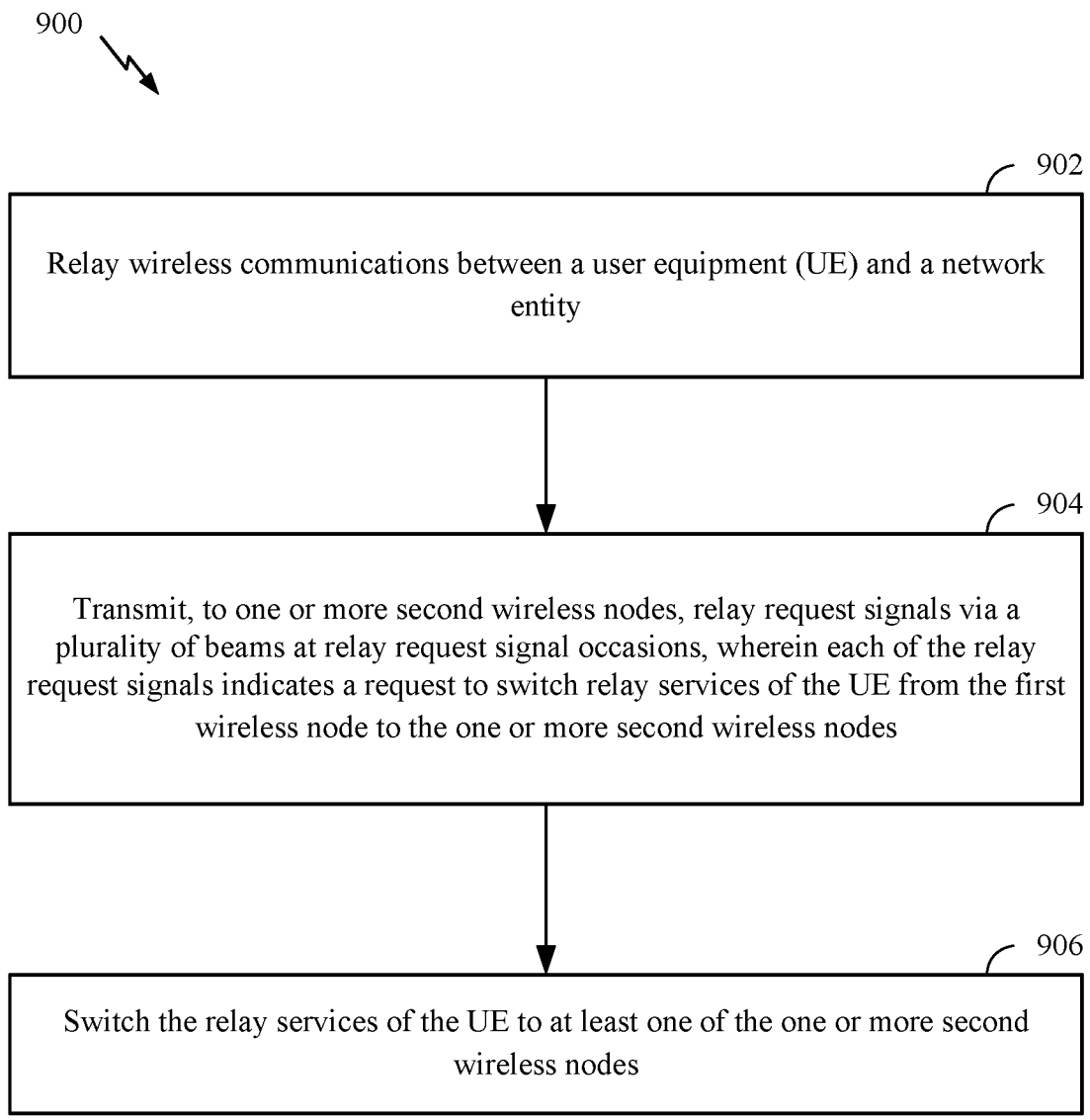
FIG. 9 is a flow diagram illustrating example operations of wireless communication by a first wireless node, in accordance with certain aspects of the present disclosure.

FIG. 9 is a flow diagram illustrating example operations 900 for wireless communication, in accordance with certain aspects of the present disclosure. The operations 900 may be performed, for example, by a wireless node (e.g., the SRN 120a of FIG. 4). The operations 900 may be implemented as software components that are executed and run on one or more processors (e.g., controller/processor 280 of FIG. 2). Further, the transmission and reception of signals by the wireless node in operations 900 may be enabled, for example, by one or more antennas (e.g., antennas 252 of FIG. 2). In certain aspects, the transmission and/or reception of signals by the wireless node may be implemented via a bus interface of one or more processors (e.g., controller/processor 280) obtaining and/or outputting signals.

The operations 900 may begin at 902, where a first wireless node (e.g., the SRN 120a of FIG. 4) may relay wireless communications between a UE (e.g., the UE 120b of FIG. 4) and a network entity (e.g., the BS 110 of FIG. 4). At 904, the first wireless node may transmit, to one or more second wireless nodes (e.g., the NRNs 120c-g of FIG. 4), relay request signals via a plurality of beams (e.g., the beams 402a-d) at relay request signal occasions. Each of the relay request signals indicates a request to switch relay services of the UE from the first wireless node to the one or more second wireless nodes. At 906, the first wireless node may switch the relay services of the UE to at least one of the one or more second wireless nodes.

In certain aspects, performing wireless communication relay services (also called relay services) of the UE may include relaying wireless communications between the UE and the network entity.

In aspects, the first wireless node may wirelessly communicate with the second wireless via beamformed transmission on a set of beams. For example, transmitting the relay request signals at 904 may include transmitting each of the relay request signals via a different beam of the plurality of beams at a different relay request signal occasion of the relay request signal occasions. In aspects, each of the beams may correspond to a different transmit direction (e.g., an azimuth and/or elevation) and a different relay request occasion.

In aspects, the relay request signals may include one or more wake-up signals (WUS) detectable while a UE is in a lower power state (and/or detectable with certain low power hardware). For example, the wake-up signals may include a sequence of symbols detectable with low power consumption such as less than 1 mW. In certain cases, the wake-up signal may be modulated with an amplitude and phase-based modulation.

In aspects, after transmitting the RRSs at 904, the first wireless node may receive one or more acknowledgement signals from the second wireless nodes, for example, as described herein with respect to FIG. 6. As an example, switching the relay services at 906 may further include the first wireless node receiving, from at least one of the one or more second wireless nodes, one or more acknowledgement signals at one or more acknowledgement signal occasions. In aspects, each of the acknowledgement signal occasions is associated with one of the relay request signal occasions respectively, for example, as described herein with respect to FIG. 6.

After receiving the acknowledgement signals, the first wireless node may select a beam associated with at least one of the acknowledgement signals and transmit CSs via the selected beams to the second wireless nodes, for example, as described herein with respect to FIG. 7. For example, switching the relay services at 906 may further include the first wireless node transmitting, to the at least one of the second wireless nodes, one or more control signals via at least one of the plurality of beams at one or more control signal occasions. In aspects, each of the control signals may indicate to the second wireless nodes to transmit one or more discovery signals at one or more discovery signal occasions.

Each of the beams used to transmit the control signals may correspond to one of the plurality of beams associated with one of the relay request signals. For example, the beam 706a may correspond to the beam 602a, such that the beam 706a is transmitted in the same direction (e.g., azimuth and/or elevation) as the beam 602a, and in certain aspects, the beam 706a may have the same coverage area as the beam 602a.

In aspects, each of the control signal occasions may be associated with one of the relay request signal occasions respectively. For example, CS occasion 1 of FIG. 7 may be associated with WUS occasion 1 of FIG. 6. In aspects, each of the control signal occasions may be associated with one of the acknowledgement signal occasions respectively, for example, as depicted in FIG. 7. In aspects, each of the discovery signal occasions may be associated with one of the relay request signal occasions respectively. For example, DS occasion 1 of FIG. 8 may be associated with WUS occasion 1 of FIG. 6. In aspects, each of the discovery signal occasions may be associated with one of the control signal occasions respectively, for example, as depicted in FIG. 8.

In aspects, the first wireless node may identify the one or more acknowledgement signal occasions when the one or more acknowledgement signals are received and determine the one or more control signal occasions associated with the identified acknowledgement signal occasions. The first wireless node may transmit the one or more control signals via at least one of the beams at the one or more determined control signal occasions.

In aspects, the first wireless node may configure the UE (e.g., via sidelink control information) with discovery signal occasions to receive the discovery signals from the second wireless node. As an example, the first wireless node may transmit, to the UE, a signal indicating a measurement configuration for the UE to discover the one or more second wireless nodes via one or more discovery signals. In aspects, the measurement configuration may indicate one or more discovery signal occasions for receiving the one or more discovery signals from the second wireless nodes.

In aspects, the first wireless node may configure associations between the various signals used to discover and activate neighbor wireless nodes, such as the second wireless nodes. The configured associations may be provided by a network entity (e.g., a BS), for example. In certain cases, the first wireless node may configure at least one of the second wireless nodes with one or more associations between the relay request signal occasions and at least one of acknowledgement signal occasions, control signal occasions, discovery signal occasions, or the plurality of beams.

In aspects, the first wireless node may configure the second wireless nodes with the associations via an indication common to all the occasions. For example, the first wireless node may transmit, to at least one of the one or more second wireless nodes, at least one broadcasting signal (e.g., one or more SS blocks) indicating the one or more associations.

In certain aspects, the associations may be indicated to the second wireless on a per beam basis. For example, the first wireless node may transmit, to at least one of the one or more second wireless nodes via one of the plurality of beams, at least one broadcasting signal indicating an association between one of the relay request signal occasions and at least one of an acknowledgement signal occasion, a control signal occasion, a discovery signal occasion, or the one of the plurality of beams. In aspects, the beam used to transmit the broadcasting signal may correspond to the beam associated with the various occasions indicated by the broadcasting signal, such that the beam used to transmit the broadcasting signal may have the same transmit direction and/or cover the same area as the beam associated with the various occasions indicated by the broadcasting signal. For example, an indication of the association may be transmitted via a sidelink-SS block with a beam that is identical to a RRS beam and/or CS beam.

In certain aspects, the associations may be indicated via a beam that covers multiple beams used to discover and activate neighbor wireless nodes. For example, the first wireless node may transmit, to at least one of the second wireless nodes via a beam, at least one broadcasting signal indicating an association between a set of the relay request signal occasions and at least one of acknowledgement signal occasions, control signal occasions, discovery signal occasions, or a set of the plurality of beams, where the beam may correspond to the set of beams indicated via the broadcasting signal. The beam used to transmit the broadcasting signal may correspond to the set of beams by having the same transmit direction and/or covering the same area as the set of beams associated with the various occasions indicated by the broadcasting signal.

In aspects, a network entity may configure the first wireless node with the associations. For example, the first wireless node may receive, from the network entity, a configuration (e.g., control signaling including downlink control information (DCI), radio resource control (RRC) messages, and/or medium access control (MAC) control elements) indicating one or more associations between the relay request signal occasions and at least one of acknowledgement signal occasions, control signal occasions, or discovery signal occasions.

Figure 10:
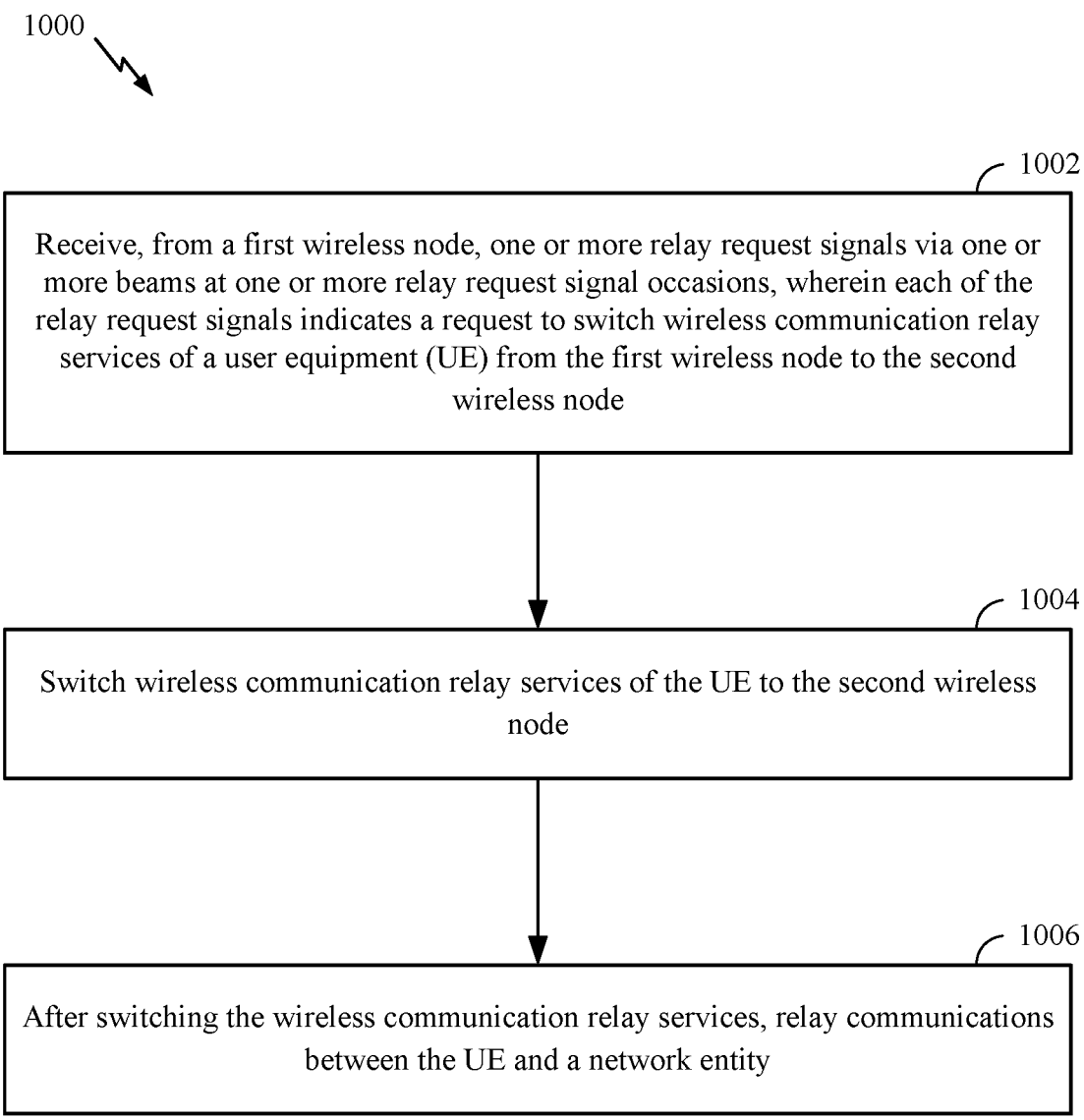
FIG. 10 is a flow diagram illustrating example operations of wireless communication by a second wireless node, in accordance with certain aspects of the present disclosure.

FIG. 10 is a flow diagram illustrating example operations 1000 for wireless communication, in accordance with certain aspects of the present disclosure. The operations 1000 may be performed, for example, by a wireless node (e.g., the NRN 120c of FIG. 4). Aspects of the operations 1000 may be complimentary to the operations 900 performed by the first wireless node. The operations 1000 may be implemented as software components that are executed and run on one or more processors (e.g., controller/processor 280 of FIG. 2). Further, the transmission and reception of signals by the wireless node in operations 1000 may be enabled, for example, by one or more antennas (e.g., antennas 252 of FIG. 2). In certain aspects, the transmission and/or reception of signals by the wireless node may be implemented via a bus interface of one or more processors (e.g., controller/processor 280) obtaining and/or outputting signals.

The operations 1000 may begin at 1002, where a second wireless node (e.g., the NRNs 120c-g of FIG. 4) may receive, from a first wireless node (e.g., the SRN 120a of FIG. 4), one or more relay request signals via one or more beams at one or more relay request signal occasions. Each of the relay request signals indicates a request to switch wireless communication relay services of a UE (e.g., the UE 120b of FIG. 4) from the first wireless node to the second wireless node. At 1004, the second wireless node may switch wireless communication relay services of the UE from the first wireless node to the second wireless node. At 1006, the second wireless node may relay communications between the UE and a network entity (e.g., the BS 110 of FIG. 4), after switching the wireless communication relay services.

In certain aspects, performing wireless communication relay services (also called relay services) of the UE may include relaying wireless communications between the UE and the network entity.

In aspects, the second wireless node may wirelessly communicate with the first wireless via beamformed transmission on a set of beams. For example, receiving the relay request signals at 1002 may include receiving each of the relay request signals via a different beam of the one or more beams at a different relay request signal occasion of the one or more relay request signal occasions. In aspects, each of the beams may correspond to a different transmit direction (e.g., an azimuth and/or elevation) and a different relay request occasion.

In aspects, the relay request signals may include one or more wake-up signals detectable while a UE is in a lower power state (and/or detectable with certain low power hardware). For example, the wake-up signals may include a sequence of symbols detectable with low power consumption such as less than 1 mW. In certain cases, the wake-up signal may be modulated with an amplitude and phase-based modulation.

The method of claim 21, after receiving the RRS at 1002, the second wireless node may transmit an AS to the first wireless node, for example, as described herein with respect to FIG. 6. For example, switching the relay services may further comprise the second wireless node transmitting, to the first wireless node, an acknowledgement signal at an acknowledgement signal occasion. In aspects, the acknowledgement signal occasion is associated with one of the relay request signal occasions. In aspects, the second wireless node may transmit the acknowledgement signal based on properties of one of the relay request signals received at one of the relay request signal occasions associated with the acknowledgement signal occasion. In certain cases, the second wireless node may select one of acknowledgement occasions associated with the properties of the relay request signals, such as channel quality, SNR, SINR, SNDR, RSSI, or the like. For example, the second wireless node may select the acknowledgement occasion associated with one of the RRS that provides that provides the best channel quality compared to the RRSs.

After transmitting the acknowledgement signals, the second wireless node may receive a control signal at a control signal occasion associated with the acknowledgement signal, for example, as described herein with respect to FIG. 7. In aspects, switching the relay services may further comprises the second wireless node receiving, from the first wireless node, one or more control signals via at least one of the plurality of beams at one or more control signal occasions. In aspects, each of the control signal occasions is associated with one of the acknowledgement signal occasions and indicates to the second wireless nodes to transmit one or more discovery signals.

In aspects, each of the control signal occasions may be associated with at least one of the relay request signal occasions. For example, CS occasion 1 of FIG. 7 may be associated with WUS occasion 1 of FIG. 6. Each of the control signal occasions may be associated with at least one of the acknowledgement signal occasions, for example, as depicted in FIG. 7.

Each of the beams used to transmit the control signals may correspond to one of the plurality of beams associated with one of the relay request signals. For example, the beam 706a may correspond to the beam 602a, such that the beam 706a is transmitted in the same direction (e.g., azimuth and/or elevation) as the beam 602a, and in certain aspects, the beam 706a may have the same coverage area as the beam 602a.

After receiving the control signal, the second wireless node may transmit a discovery signal at a discovery signal occasion to the UE. For example, switching the relay services may further comprises the second wireless node transmitting, to the UE, one or more discovery signals at a discovery signal occasion. In aspects, each of the discovery signals is associated with at least one of the control signals and indicates to the UE to switch relay services.

In certain aspects, the discovery signal occasion may be associated with one of the relay request signal occasions. For example, DS occasion 1 of FIG. 8 may be associated with WUS occasion 1 of FIG. 6. In aspects, the discovery signal occasion may be associated with one of the control signal occasions, for example, as depicted in FIG. 8.

In certain cases, as multiple NRNs may receive a control signal associated with a discovery signal occasion, the discovery signals transmitted by the NRNs may collide in the same discovery signal occasion. In order to reduce the interference from these NRNs, the discovery signals may be transmitted based on a Zadoff-Chu sequence. In certain aspects, the discovery signal occasion may be selected from a plurality of time-frequency resources associated with the discover signal occasion. For example, the NRN 120c of FIG. 8 may select a different time-frequency resource than the NRN 120g to transmit the discovery signal at the respective discovery signal occasion. In aspects, each of the time-frequency resources may be associated with a different relay request signal occasion or a different control signal occasion, which may be associated with the discovery signal occasion.

In aspects, the second wireless node may configure associations between the various signals used to monitor and respond to the various signals for discovering and activating the neighbor relay nodes. For example, the second wireless node may configure one or more associations between the relay request signal occasions and at least one of acknowledgement signal occasions, control signal occasions, discovery signal occasions, or the plurality of beams.

In aspects, the first wireless node may configure the second wireless nodes with the associations via an indication common to all the occasions. For example, the second wireless node may receive, from the first wireless node, at least one broadcasting signal indicating the one or more associations, and the second wireless node may configure the associations based on the indication in the at least one broadcasting signal.

In certain aspects, the associations may be indicated to the second wireless on a per beam basis. In certain cases, the second wireless node may receive, from the first wireless node via one of the plurality of beams, at least one broadcasting signal indicating an association between one of the relay request signal occasions and at least one of an acknowledgement signal occasion, a control signal occasion, a discovery signal occasion, or the one of the plurality of beams. The second wireless node may configure the associations based on the indication in the at least one broadcasting signal. In aspects, the beam used to transmit the broadcasting signal may correspond to the beam associated with the various occasions indicated by the broadcasting signal, such that the beam used to transmit the broadcasting signal may have the same transmit direction and/or cover the same area as the beam associated with the various occasions indicated by the broadcasting signal. For example, an indication of the association may be received via a sidelink-SS block with a beam that is identical to a RRS beam and/or CS beam.

In certain aspects, the associations may be indicated via a beam that covers multiple beams used to discover and activate neighbor wireless nodes. In certain cases, the second wireless node may receive, from the first wireless node via a beam, at least one broadcasting signal indicating an association between a set of the relay request signal occasions and at least one of acknowledgement signal occasions, control signal occasions, discovery signal occasions, or a set of the plurality of beams, where the beam may correspond to the set of beams indicated via the broadcasting signal. The second wireless node may configure the associations based on the indication in the at least one broadcasting signal. The beam used to transmit the broadcasting signal may correspond to the set of beams by having the same transmit direction and/or covering the same area as the set of beams associated with the various occasions indicated by the broadcasting signal.

In aspects, a network entity may configure the first wireless node with the associations. For example, the second wireless node may receive, from the network entity, a configuration (e.g., control signaling including DCI, RRC messages, and/or MAC control elements) indicating one or more associations between the relay request signal occasions and at least one of acknowledgement signal occasions, control signal occasions, or discovery signal occasions. The second wireless node may configure the associations based on the configuration.

Figure 11:
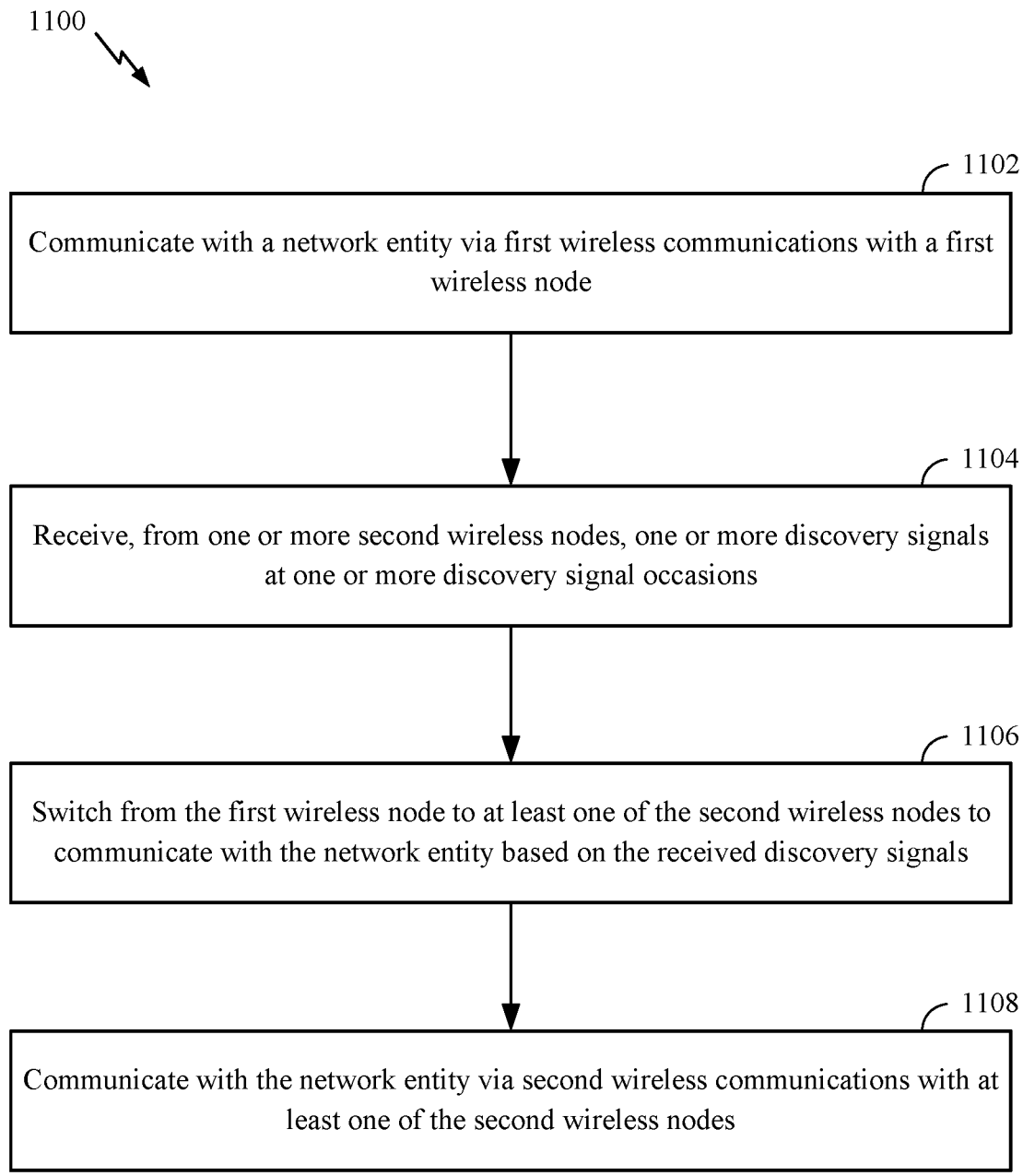
FIG. 11 is a flow diagram illustrating example operations of wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by an UE (e.g., the UE 120b of FIG. 4). The operations 1100 may be complimentary to the operations 900 performed by the first wireless node and/or the operations 1000 performed by the second wireless node. The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin at 1102, where the UE communicates with a network entity (e.g., the BS 110 of FIG. 4) via first wireless communications with a first wireless node (e.g., the SRN 120a of FIG. 4). At 1104, the UE receives, from one or more second wireless nodes, one or more discovery signals at one or more discovery signal occasions. At 1106, the UE switches from the first wireless node to at least one of the second wireless nodes to communicate with the network entity based on the received discovery signals. At 1108, the UE communicates with the network entity via second wireless communications with at least one of the second wireless nodes.

In aspects, the UE may be configured with a measurement configuration that indicates the discovery occasions for discovering the NRNs. For example, the UE may receive, from the first wireless node, a signal indicating a measurement configuration for the UE to discover the one or more second wireless nodes via the one or more discovery signal, and receiving the one or more discovery signals at 1104 may comprise receiving the one or more discovery signal based on the measurement configuration. In aspects, the measurement configuration indicates the one or more discovery signal occasions for receiving the one or more discovery signals.

Figure 12:
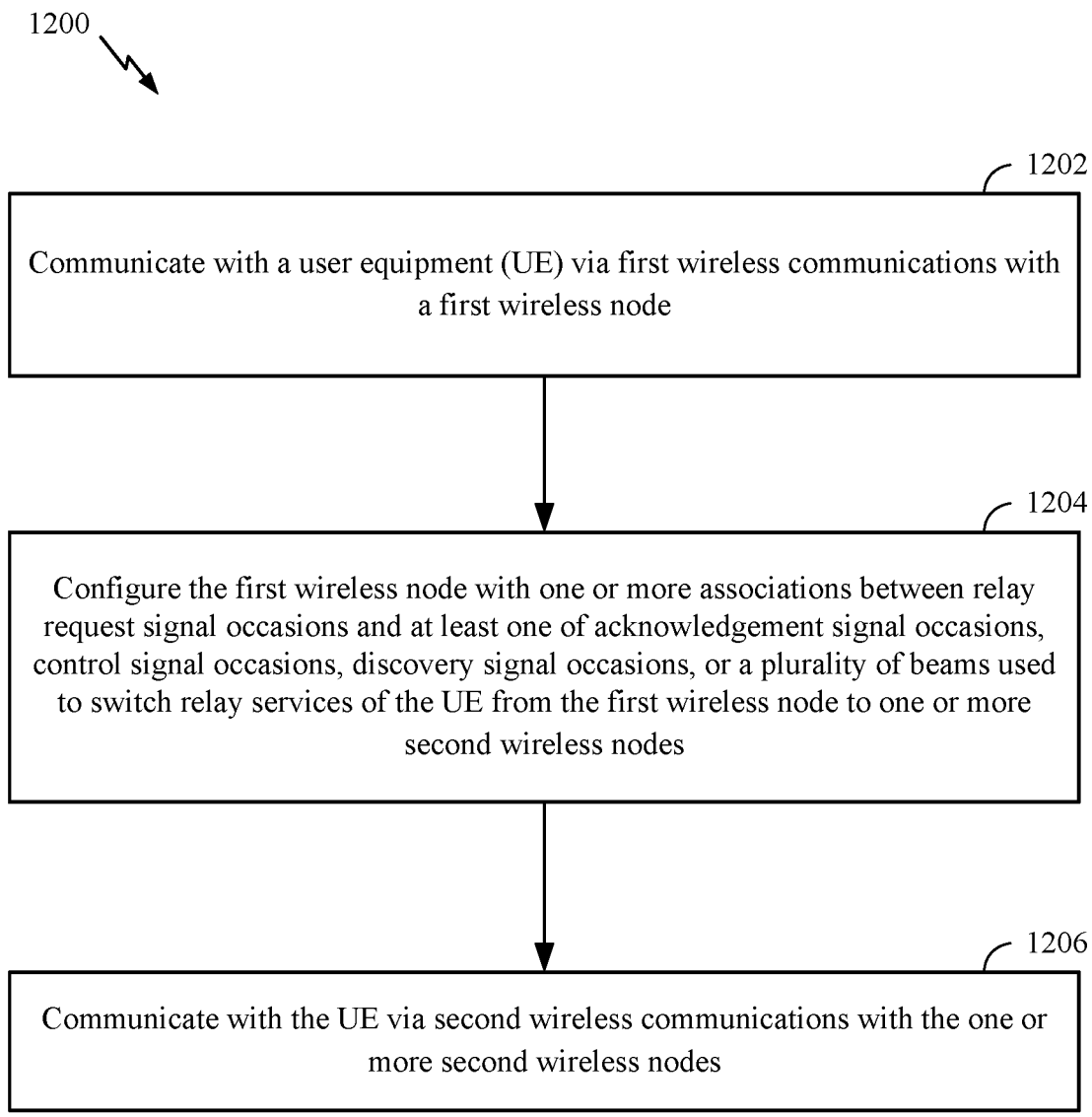
FIG. 12 is a flow diagram illustrating example operations of wireless communication by a BS, in accordance with certain aspects of the present disclosure.

FIG. 12 is a flow diagram illustrating example operations 1200 for wireless communication, in accordance with certain aspects of the present disclosure. The operations 1200 may be performed, for example, by a network entity (e.g., the BS 110 of FIG. 4). The operations 1200 may be complimentary to the operations 900 performed by the first wireless node and/or the operations 1000 performed by the second wireless node. The operations 1200 may be implemented as software components that are executed and run on one or more processors (e.g., controller/processor 240 of FIG. 2). Further, the transmission and reception of signals by the network entity in operations 1200 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

The operations 1200 may begin at 1202, where the network entity communicates with a UE via first wireless communications with a first wireless node. At 1204, the network entity configures the first wireless node with one or more associations between relay request signal occasions and at least one of acknowledgement signal occasions, control signal occasions, discovery signal occasions, or a plurality of beams used to switch relay services of the UE from the first wireless node to one or more second wireless nodes. At 1206, the network entity communicates with the UE via second wireless communications with the one or more second wireless nodes.

In aspects, configuring the first wireless node at 1204 may include the network entity transmitting, to the first wireless node, a signal (e.g., control signaling including DCI, RRC messages, and/or MAC control elements) indicating the one or more associations.

In aspects, the network entity may configure the one or more second wireless nodes with the one or more associations. For example, the network entity may transmit, to the one or more second wireless nodes, a signal (e.g., control signaling including DCI, RRC messages, and/or MAC control elements) indicating the one or more associations.

While the examples provided herein are described with respect to a wireless relay node relaying wireless communications between a UE and a network entity, such as a base station, to facilitate understanding, aspects of the present disclosure may also apply to a wireless relay node relaying wireless communications between the UE and another UE, such as UE 120c of FIGS. 1 and 4.

Figure 13:
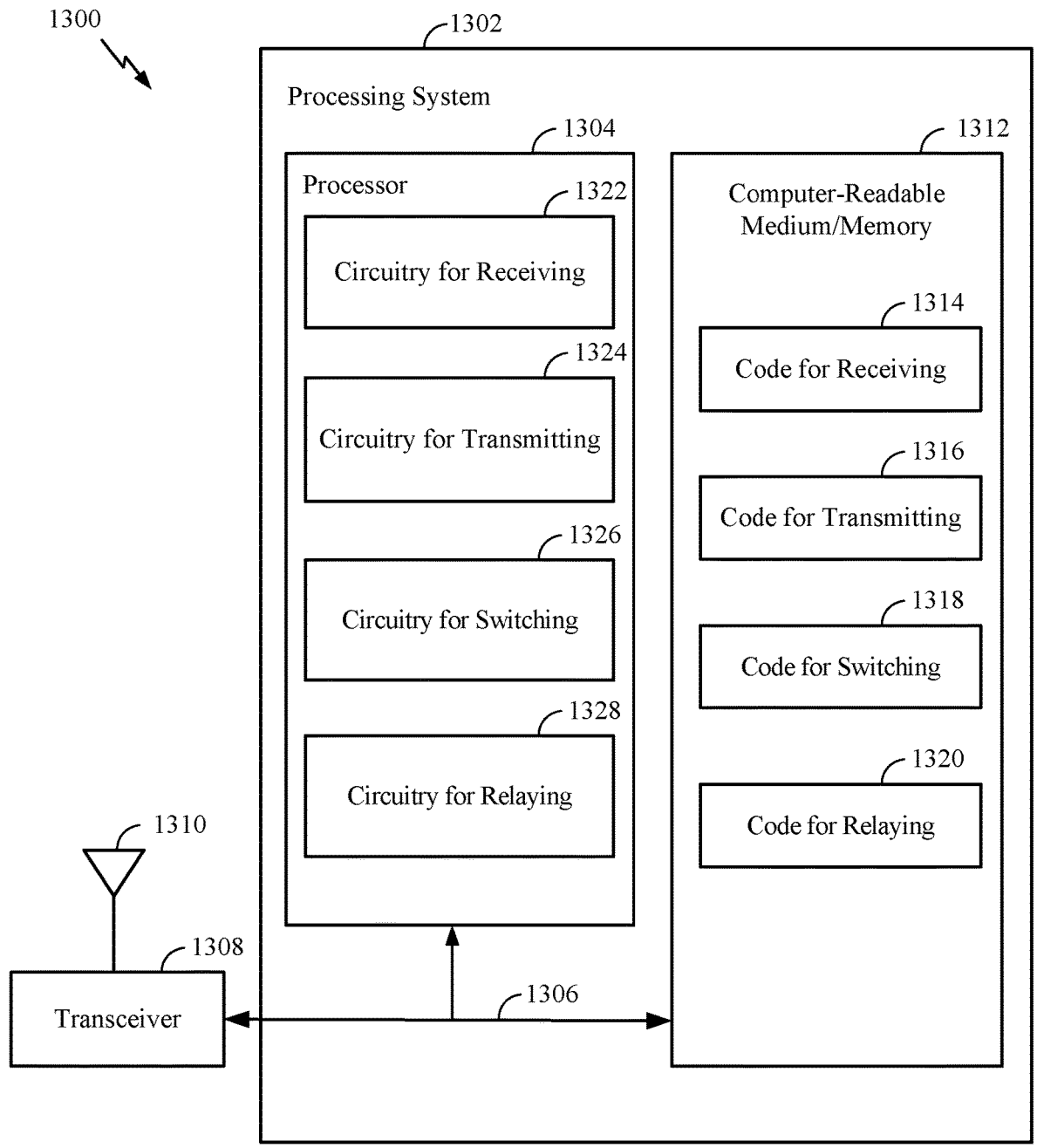
FIG. 13 illustrates a communications device (e.g., a UE) that may include various components configured to perform operations for the techniques disclosed herein in accordance with aspects of the present disclosure.

FIG. 13 illustrates a communications device 1300 (e.g., the SRN 120a, UE 120b, or NRN 120c) that may include various components (e.g., corresponding to means-plus-function components) configured to perform operations for the techniques disclosed herein, such as the operations illustrated in FIG. 9, FIG. 10, and/or FIG. 11. The communications device 1300 includes a processing system 1302 coupled to a transceiver 1308 (e.g., a transmitter and/or receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, FIG. 10, and/or FIG. 11, or other operations for performing the various techniques discussed herein for performing a relay node switch. In certain aspects, computer-readable medium/memory 1312 stores code for receiving 1314, code for transmitting 1316, code for switching 1318, code for relaying 1320, and/or code for communicating, which may include code for receiving 1314 and/or code for transmitting 1316. In certain aspects, the processor 1304 has circuitry configured to implement the code stored in the computer-readable medium/memory 1312. The processor 1304 includes circuitry for receiving 1322, circuitry for transmitting 1324, circuitry for switching 1326, circuitry for relaying 1328, and/or circuitry for communicating, which may include circuitry for receiving 1322 and/or circuitry for transmitting 1324.

Figure 14:
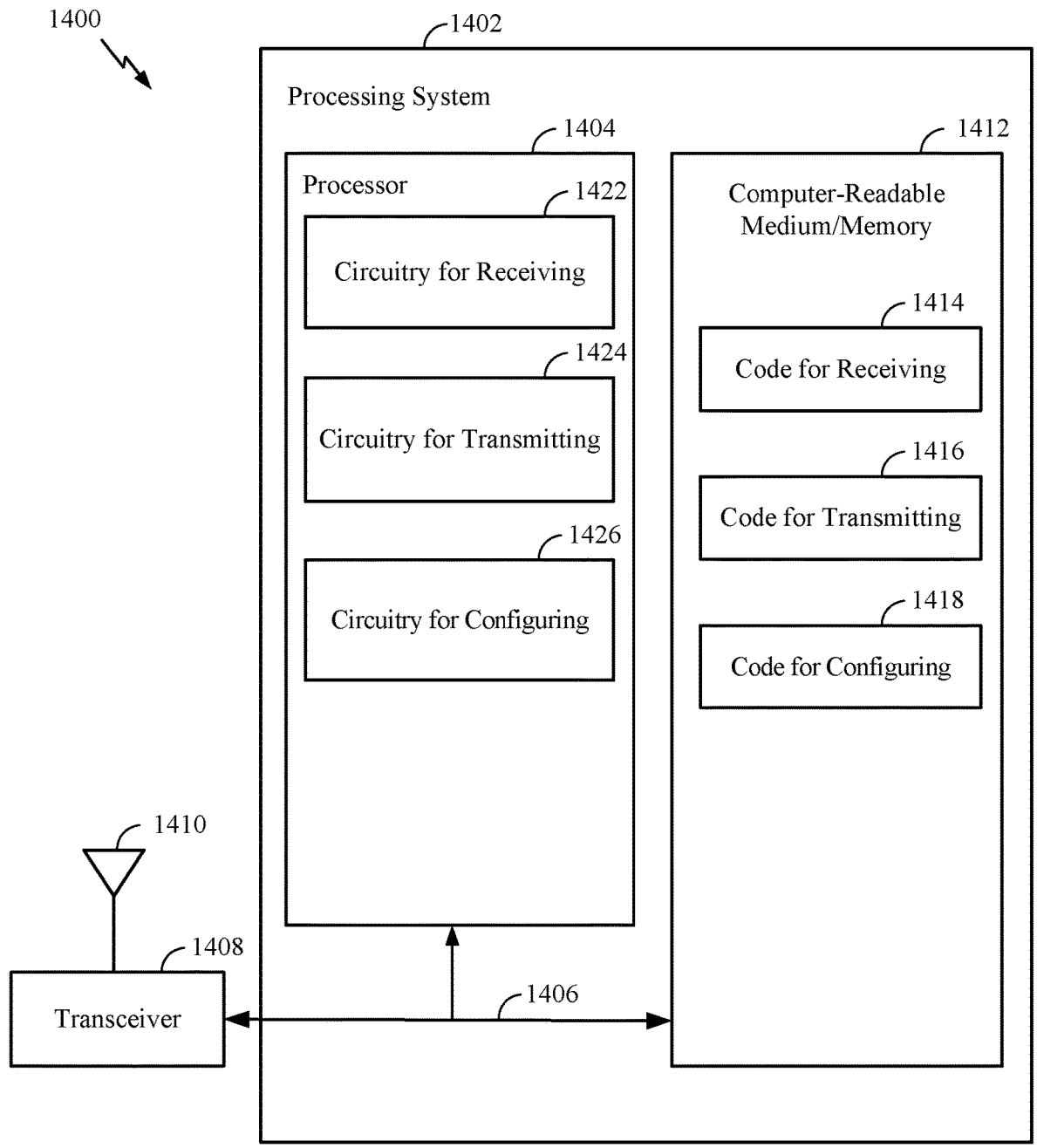
FIG. 14 illustrates a communications device (e.g., a BS) that may include various components configured to perform operations for the techniques disclosed herein in accordance with aspects of the present disclosure.

FIG. 14 illustrates a communications device 1400 (e.g., the BS 110) that may include various components (e.g., corresponding to means-plus-function components) configured to perform operations for the techniques disclosed herein, such as the operations illustrated in FIG. 12. The communications device 1400 includes a processing system 1402 coupled to a transceiver 1408 (e.g., a transmitter and/or receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein for configuring a relay node switch. In certain aspects, computer-readable medium/memory 1412 stores code for receiving 1414, code for transmitting 1416, code for configuring 1418, and/or code for communicating, which may include code for receiving 1414 and/or code for transmitting 1416. In certain aspects, the processor 1404 has circuitry configured to implement the code stored in the computer-readable medium/memory 1412. The processor 1404 includes circuitry for receiving 1422, circuitry for transmitting 1424, circuitry for configuring 1426, and/or circuitry for communicating, which may include circuitry for receiving 1422 and/or circuitry for transmitting 1424.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9, FIG. 10, FIG. 11, and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a first wireless node, comprising:
   relaying wireless communications between a user equipment (UE) and a second wireless node;
   transmitting, to one or more third wireless nodes, relay request signals via a plurality of beams at relay request signal occasions, wherein each of the relay request signals indicates a request to switch relay services of the UE from the first wireless node to the one or more third wireless nodes; and
   switching the relay services of the UE to at least one of the one or more third wireless nodes.

2. The method of claim 1, wherein transmitting the relay request signals comprises transmitting each of the relay request signals via a different beam of the plurality of beams at a different relay request signal occasion of the relay request signal occasions.

3. The method of claim 1, wherein each of the plurality of beams corresponds to a different transmit direction and a different relay request occasion, wherein the second wireless node includes a network entity or another UE.

4. The method of claim 1, wherein the relay request signals include one or more wake-up signals.

5. The method of claim 1, wherein switching the relay services further comprises receiving, from at least one of the one or more third wireless nodes, one or more acknowledgement signals at one or more acknowledgement signal occasions.

6. The method of claim 5, wherein each of the acknowledgement signal occasions is associated with one of the relay request signal occasions respectively.

7. The method of claim 5, wherein switching the relay services further comprises:
   transmitting, to the at least one of the one or more third wireless nodes, one or more control signals via at least one of the plurality of beams at one or more control signal occasions; and
   wherein each of the control signals indicates to the at least one of the one or more third wireless nodes to transmit one or more discovery signals at one or more discovery signal occasions.

8. The method of claim 7, wherein each of the control signal occasions is associated with one of the relay request signal occasions respectively or associated with one of the acknowledgement signal occasions respectively.

9. The method of claim 8, wherein each of the at least one of the plurality of beams corresponds to one of the plurality of beams associated with one of the relay request signals.

10. The method of claim 7, wherein each of the discovery signal occasions is associated with one of the relay request signal occasions respectively or associated with one of the control signal occasions respectively.

11. The method of claim 7, further comprising:
    identifying the one or more acknowledgement signal occasions when the one or more acknowledgement signals are received;
    determining the one or more control signal occasions associated with the identified acknowledgement signal occasions; and wherein transmitting the one or more control signals comprises transmitting the one or more control signals via the at least one of the plurality of beams at the one or more determined control signal occasions.

12. The method of claim 1, further comprising transmitting, to the UE, a signal indicating a measurement configuration for the UE to discover the one or more third wireless nodes via one or more discovery signals, wherein the measurement configuration indicates one or more discovery signal occasions for receiving the one or more discovery signals.

13. The method of claim 1, further comprising configuring at least one of the one or more third wireless nodes with one or more associations between the relay request signal occasions and at least one of acknowledgement signal occasions, control signal occasions, discovery signal occasions, or the plurality of beams.

14. The method of claim 1, further comprising receiving, from a network entity, a configuration indicating one or more associations between the relay request signal occasions and at least one of acknowledgement signal occasions, control signal occasions, or discovery signal occasions.

15. The method of claim 1, further comprising configuring one or more associations between the relay request signal occasions and at least one of acknowledgement signal occasions, control signal occasions, discovery signal occasions, or the plurality of beams.

16. The method of claim 15, wherein configuring comprises:
receiving, from a network entity, a configuration indicating the one or more associations; and
configuring the associations based on the configuration.

17. A method of wireless communication by a second wireless node, comprising:
receiving, from a first wireless node, one or more relay request signals via one or more beams at one or more relay request signal occasions, wherein each of the relay request signals indicates a request to switch wireless communication relay services of a user equipment (UE) from the first wireless node to the second wireless node;
switching wireless communication relay services of the UE to the second wireless node; and
after switching the wireless communication relay services, relaying communications between the UE and a third wireless node.

18. The method of claim 17, wherein receiving the relay request signals comprises receiving each of the relay request signals via a different beam of the one or more beams at a different relay request signal occasion of the one or more relay request signal occasions.

19. The method of claim 17, wherein each of the one or more beams corresponds to a different transmit direction and different relay request occasion, wherein the second wireless node includes a network entity or another user equipment.

20. The method of claim 17, wherein the relay request signals include one or more wake-up signals.

21. The method of claim 17, wherein switching the relay services further comprises transmitting, to the first wireless node, an acknowledgement signal at an acknowledgement signal occasion.

22. The method of claim 21, wherein the acknowledgement signal occasion is associated with one of the relay request signal occasions.

23. The method of claim 21, wherein transmitting the acknowledgement signal is based on properties of one of the relay request signals received at one of the relay request signal occasions associated with the acknowledgement signal occasion.

24. The method of claim 21, wherein switching the relay services further comprises:
receiving, from the first wireless node, one or more control signals via at least one of the one or more beams at one or more control signal occasions;
wherein each of the control signal occasions is associated with one of the acknowledgement signal occasions and indicates to the second wireless nodes to transmit one or more discovery signals.

25. The method of claim 24, wherein each of the control signal occasions is associated with at least one of the relay request signal occasions or associated with at least one of the acknowledgement signal occasions.

26. The method of claim 24, wherein each of the at least one of the one or more beams corresponds to one of the one or more beams associated with the relay request signals.

27. The method of claim 24, wherein switching the relay services further comprises:
transmitting, to the UE, one or more discovery signals at a discovery signal occasion;
wherein each of the discovery signals is associated with at least one of the control signals and indicates to the UE to switch relay services.

28. The method of claim 27, wherein the discovery signal occasion is associated with one of the relay request signal occasions or associated with one of the control signal occasions.

29. A method of wireless communication by a user equipment (UE), comprising:
communicating with a first wireless node via first wireless communications with a second wireless node;
receiving, from one or more third wireless nodes, one or more discovery signals at one or more discovery signal occasions;
switching from the second wireless node to at least one of the third wireless nodes to communicate with the first wireless node based on the received discovery signals; and
communicating with the first wireless node via second wireless communications with at least one of the third wireless nodes.

30. The method of claim 29, further comprising:
receiving, from the second wireless node, a signal indicating a measurement configuration for the UE to discover the one or more third wireless nodes via the one or more discovery signals, wherein the measurement configuration indicates the one or more discovery signal occasions for receiving the one or more discovery signals; and
wherein receiving the one or more discovery signals comprises receiving the one or more discovery signal based on the measurement configuration.

31. A method of wireless communication by a network entity, comprising:
communicating with a user equipment (UE) via first wireless communications with a first wireless node;
configuring the first wireless node with one or more associations between relay request signal occasions and at least one of acknowledgement signal occasions, control signal occasions, discovery signal occasions, or a plurality of beams used to switch relay services of the UE from the first wireless node to one or more second wireless nodes; and communicating with the UE via second wireless communications with the one or more second wireless nodes.

32. The method of claim 31, further comprising:
configuring the one or more second wireless nodes with the one or more associations, wherein configuring the one or more second wireless nodes comprises transmitting, to the one or more second wireless nodes, a signal indicating the one or more associations; and
wherein configuring the first wireless node comprises transmitting, to the first wireless node, a signal indicating the one or more associations.

* * * * *